(12) United States Patent
Suzuki

(10) Patent No.: US 10,250,773 B2
(45) Date of Patent: Apr. 2, 2019

(54) IMAGE READING DEVICE, METHOD OF ADJUSTING DISTANCE BETWEEN DOCUMENT AND LIGHT RECEIVING SENSOR IN THE DEVICE, AND DISTANCE ADJUSTMENT PROGRAM

(71) Applicant: Konica Minolta, Inc., Chiyoda-ku, Tokyo (JP)

(72) Inventor: Hiroyuki Suzuki, Toyokawa (JP)

(73) Assignee: KONICA MINOLTA, INC., Chiyodao-ku, Tokyo (JP)

( * ) Notice: Subject to any disclaimer, the term of this patent is extended or adjusted under 35 U.S.C. 154(b) by 0 days.

(21) Appl. No.: 15/621,112

(22) Filed: Jun. 13, 2017

(65) Prior Publication Data

US 2018/0013914 A1    Jan. 11, 2018

(30) Foreign Application Priority Data

Jul. 6, 2016  (JP) .................................. 2016-134226

(51) Int. Cl.
*H04N 1/053* (2006.01)
*H04N 1/00* (2006.01)
(Continued)

(52) U.S. Cl.
CPC ........... *H04N 1/053* (2013.01); *H04N 1/0005* (2013.01); *H04N 1/00037* (2013.01);
(Continued)

(58) Field of Classification Search
None
See application file for complete search history.

(56) References Cited

U.S. PATENT DOCUMENTS 6,671,421 B1 * 12/2003 Ogata ................ H04N 1/00013
382/284
2008/0037077 A1    2/2008 Higashi et al.
(Continued)

FOREIGN PATENT DOCUMENTS

JP    2003-046735    2/2003
JP    2009-232035    10/2009
JP    2009-232035 A    10/2009

OTHER PUBLICATIONS

Extended European Search Report dated Nov. 7, 2017, in European Patent Application No. 17178986.0, 12 pages.
(Continued)

*Primary Examiner* — Thomas D Lee
(74) *Attorney, Agent, or Firm* — Squire Patton Boggs (US) LLP

(57) ABSTRACT

An image reading device includes: light receiving sensors configured to read an image of a document conveyed in a sub-scanning direction and be arranged with an interval in a main scanning direction; one pair of document conveying rollers configured to be provided in front and back of the light receiving sensors in a document conveying direction; a detection unit configured to detect an image overlap amount in an image overlap area and/or an image missing amount in an image missing area; an adjustment amount determination unit configured to determine an adjustment amount for adjusting a distance between the document and the light receiving sensors based on the image overlap amount and/or image missing amount detected; and a drive unit configured to adjust a distance between the document and the light receiving sensors by displacing one of the document conveying rollers and light receiving sensors according to the adjustment amount.

17 Claims, 19 Drawing Sheets

(51) Int. Cl.
    *H04N 1/024* (2006.01)
    *H04N 1/04* (2006.01)
    *H04N 1/047* (2006.01)
    *H04N 1/10* (2006.01)

(52) U.S. Cl.
    CPC ..... *H04N 1/00082* (2013.01); *H04N 1/02409* (2013.01); *H04N 1/04* (2013.01); *H04N 1/047* (2013.01); *H04N 1/0058* (2013.01); *H04N 1/10* (2013.01)

(56) References Cited

U.S. PATENT DOCUMENTS

| | | | |
|---|---|---|---|
| 2009/0180156 A1* | 7/2009 | Yoshimaru | H04N 1/12 358/474 |
| 2009/0195843 A1* | 8/2009 | Satoh | H04N 1/03 358/475 |
| 2010/0225983 A1 | 9/2010 | Fujii et al. | |

OTHER PUBLICATIONS

Office Action issued Nov. 26, 2018 in Chinese Patent Application No. 201710520041.7, 24 pages.

* cited by examiner

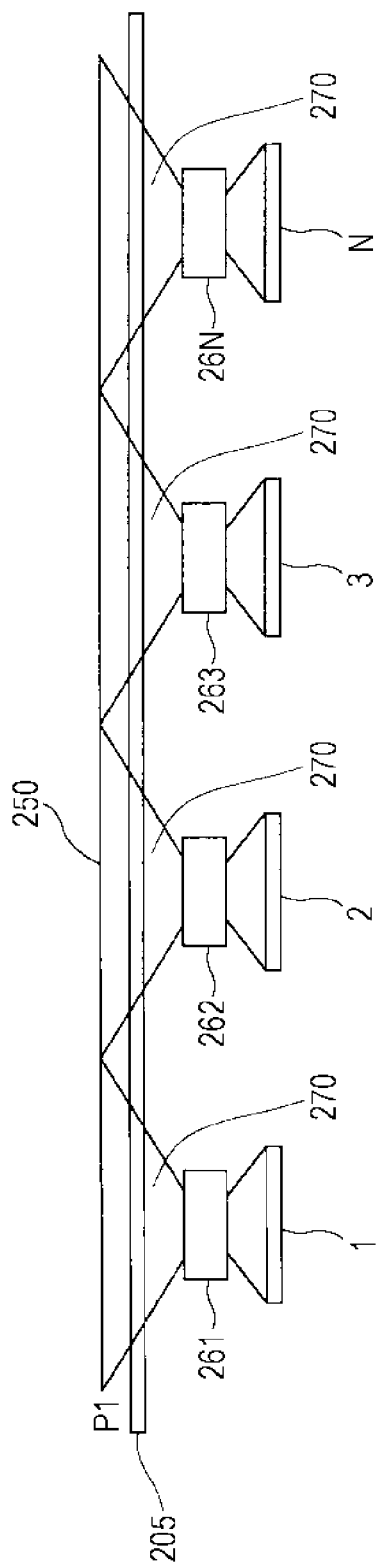

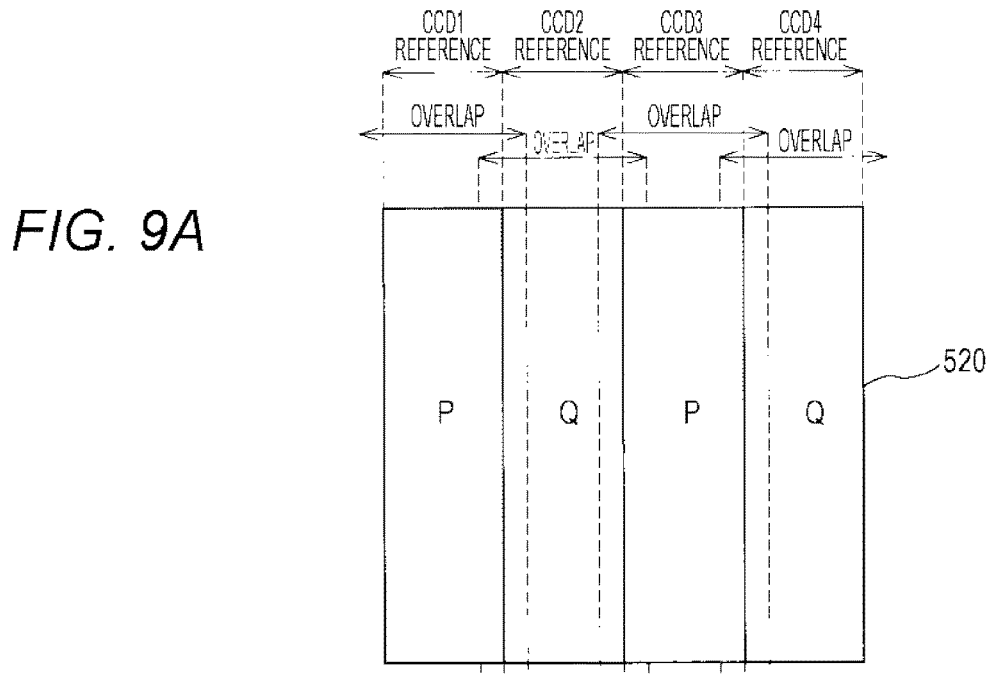
FIG. 9A
FIG. 9B
FIG. 9C
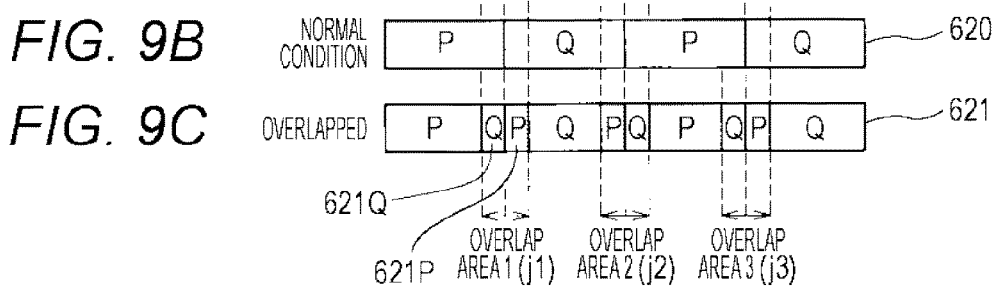
FIG. 10
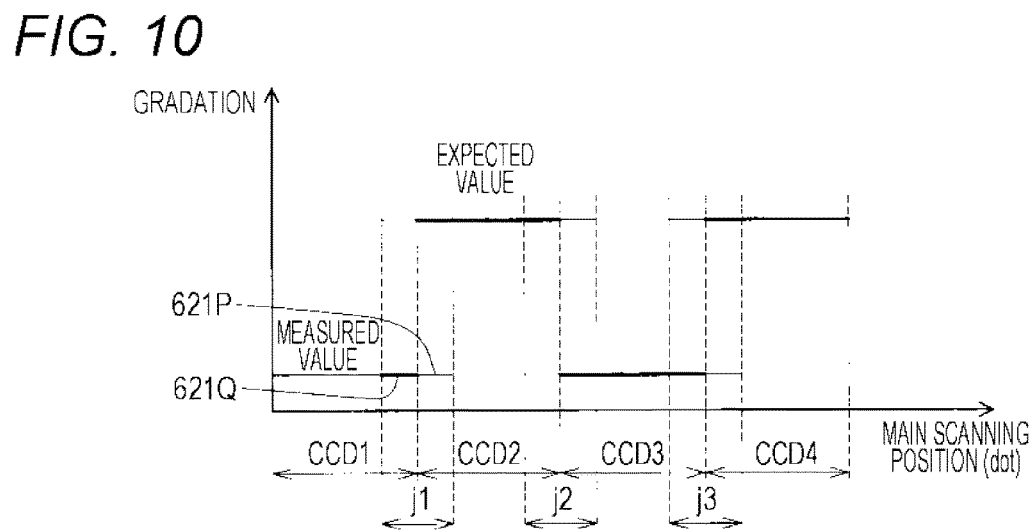

FIG. 16

EXECUTE AUTOMATIC ADJUSTMENT?

YES

PLEASE PRESS THE START BUTTON.

TARGET ROLLER: THE XXX-TH CONVEYING ROLLER
ADJUSTMENT AMOUNT: XXX

START

FIG. 18

PLEASE DISPLACE A CONVEYING ROLLER AS FOLLOWS.

TARGET ROLLER: THE XXX-TH CONVEYING ROLLER
ADJUSTMENT AMOUNT: XXX

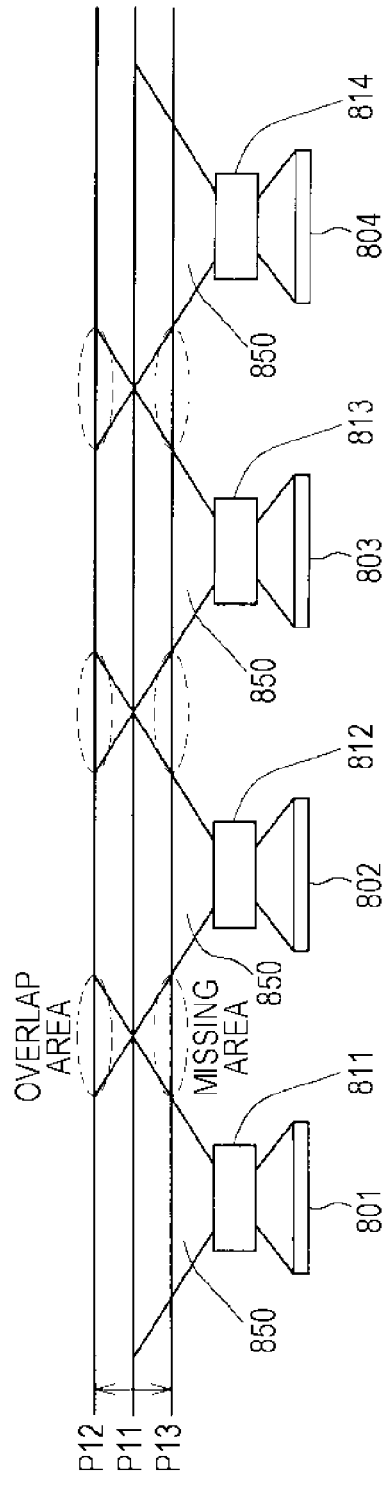
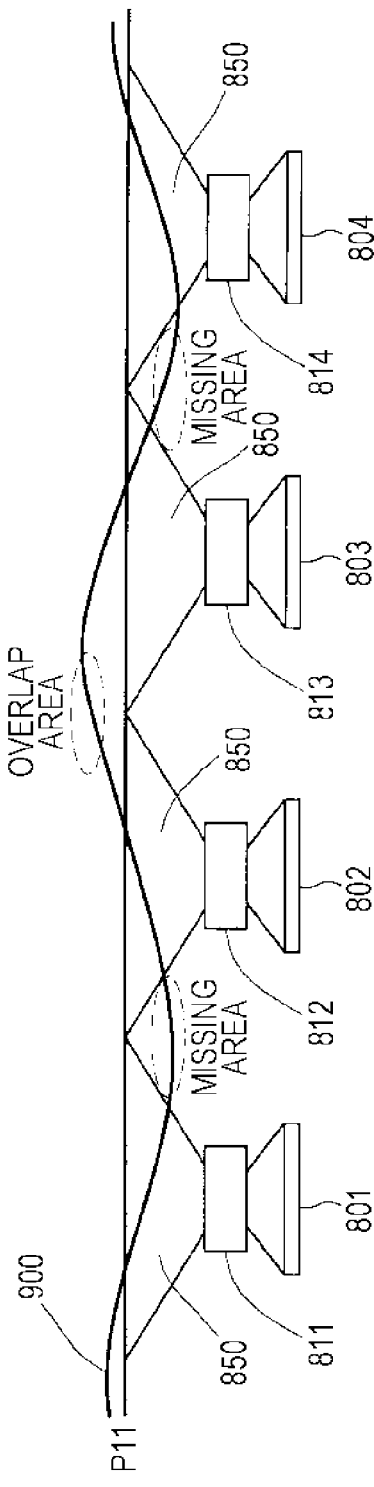

IMAGE READING DEVICE, METHOD OF ADJUSTING DISTANCE BETWEEN DOCUMENT AND LIGHT RECEIVING SENSOR IN THE DEVICE, AND DISTANCE ADJUSTMENT PROGRAM

The entire disclosure of Japanese Patent Application No. 2016-134226 filed on Jul. 6, 2016 including description, claims, drawings, and abstract are incorporated herein by reference in its entirety.

BACKGROUND OF THE INVENTION

Field of the Invention

The present invention relates to an image reading device that is used in an image forming apparatus to read an image of a document conveyed in a sub-scanning direction, a method of adjusting a distance between the document and light receiving sensors in the same device, and a distance adjustment program.

Description of the Related Art

As an image reading device having an automatic document feeder, which is included in an image forming apparatus or the like, as illustrated in FIGS. 23A and 23B, there is a known technique that a single light receiving sensor composed of a charge coupled device (CCD) sensor or the like is divided into a plurality of light receiving sensors 801 to 804 and arranged in a main scanning direction and a conveyed document is read by the respective light receiving sensors 801 to 804. With this technique, a reading unit can be realized with a lower cost and in a smaller size, compared to a single light receiving sensor. Here, the reference numerals 811 to 814 represent lenses placed above the respective light receiving sensors 801 to 804 and a reflected light 850 from the document is reduced in the lenses 811 to 814 and received by the respective light receiving sensors 801 to 804.

However, there is a problem that an affect due to variations of the distance between a reading face of a document being conveyed and the light receiving sensors 801 to 804 is easily received since a light path becomes shorter with such divided light receiving sensors 801 to 804, compared to a case of a single light receiving sensor. Concretely, as illustrated in FIG. 23A, when a document is conveyed at a position P12 displaced upward from a reference position P11, a read image is reduced and an image overlap area is generated at a border part since the document is read by both of adjacent light receiving sensors in the border part of those sensors. On the other hand, when the document is conveyed at a position P13 displaced from the reference position P11, the read image is enlarged and an image missing area, which is not read by any of the adjacent light receiving sensors, is generated.

Further, as illustrated in FIG. 23B, when the document 900 which is in a wavy condition in the main scanning direction is conveyed, image overlap areas and image missing areas occur in a mixed condition in the document in the conveying direction.

In this manner, a reading device which has a divided configuration of light receiving sensors 801 to 804 has a problem that proper read image data cannot be obtained since the distance between the document and the light receiving sensors is not proper while the document is being read.

Here, JP 2009-232035 A proposes an image reading device including a displacement detecting sensor for detecting a displacement between a contact glass and an image sensor, a sensor moving member for adjusting heights of both longitudinal ends and a center in a shorter direction, as drive target parts, of the image sensor with respect to the contact glass, and a control unit for driving and controlling the sensor moving member in response to a displacement detection signal from the displacement sensor, in the image reading device for optically reading image information from a reading target object on the contact glass by using the image sensor in which a plurality of read pixels are arranged in a line, as an image reading device enables an automatic focus adjustment of an image sensor and an easy automatic focus adjustment of a plurality of image sensors.

However, according to the technique disclosed in JP 2009-232035 A, the sensor detects a displacement between the contact glass and the image sensor, the focus of the image sensor is adjusted; however, the distance between the document and the image sensor cannot be adjusted. Thus, the technique cannot provide sufficient measurement for the problem that, when the distance between the document and the light receiving sensor is not proper while an image of a conveyed document is read by the light receiving sensor which are divided in a plural pieces in the main scanning direction, the distance cannot be adjusted and proper read image data cannot be acquired.

SUMMARY OF THE INVENTION

The present invention has been made in view of the above technical background, and an object thereof is to provide an image reading device, a method for adjusting a distance between a document and light receiving sensors in the same device and a distance adjustment program, which can control the distance when the distance between the document and the light receiving sensors while reading the conveyed document is not proper and acquire proper read image data by suppressing an occurrence of an image overlap area and/or an image missing area.

The above described object is achieved in the following means.

(1) To achieve the abovementioned object, according to an aspect, an image reading device reflecting one aspect of the present invention comprises: a plurality of light receiving sensors, which use an optical shrink system, configured to read an image of a document conveyed in a sub-scanning direction and be arranged with an interval in a main scanning direction, the plurality of light receiving sensors arranged so that border parts of reading areas read by adjacent two of the light receiving sensors in a main scanning direction correspond to each other on or near a reference conveyance plane of the document; at least one pair of document conveying rollers configured to be provided in front and back of the plurality of light receiving sensors in a document conveying direction; a detection unit configured to detect an image overlap amount in an image overlap area which occurs when a part of the document in a main scanning direction is redundantly read by the adjacent two light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensor, from a plurality of parts in the main scanning direction of the image data of the document read by the light receiving sensors; an adjustment amount determination unit configured to determine an adjustment amount for adjusting a distance between the document and the light receiving sensors in at least one part of the document in the main scanning direction based on the image overlap amount and/or image missing amount detected by the detection unit; and a drive unit configured to adjust a distance between the document and the light receiving sensors by displacing at least one of the document conveying rollers and light receiving sensors according to the adjustment amount determined by the adjustment amount determination unit.

(2) The image reading device of Item. 1, wherein the detection unit preferably detects, as the image overlap amount and/or image missing amount, a number of pixels in the main scanning direction of a region, which is a different region of an expected value of the image data in a case where an image overlap area and an image missing area do not exist, in the border parts of the image data read by the adjacent light receiving sensors.

(3) The image reading device of Item. 1 or 2, wherein the plurality of the document conveying rollers are preferably provided at intervals in a main scanning direction of the document, and the drive unit preferably displaces the document conveying roller located near the image overlap area of the document so that the distance between the document face and the light receiving sensors becomes smaller when an image overlap amount is detected, and displaces the document conveying roller located near the image missing area of the document so that the distance between the document face and the light receiving sensors becomes larger when an image missing amount is detected.

(4) The image reading device of any one of Items. 1 to 3, preferably further comprising a display unit configured to display a necessary displacement amount, which is to be executed by the drive unit, of at least one of the document conveying rollers and light receiving sensors, wherein the displacement, by the drive unit, of at least one of the document conveying rollers and light receiving sensors is preferably manually operated based on the necessary displacement amount displayed on the display unit.

(5) The image reading device of any one of Items. 1 to 3, preferably further comprising a display unit configured to display a necessary displacement amount, by the drive unit, of at least one of the document conveying rollers and light receiving sensors, wherein the necessary displacement amount displayed on the display unit is preferably a displacement amount to instruct the drive unit to execute an automatic control.

(6) The image reading device of anyone of Items. 1 to 5, wherein the adjustment amount determination unit preferably determines an adjustment amount by converting the image overlap amount and/or image missing amount detected by the detection unit into a corresponding adjustment amount with reference to a table in which a relationship between the image overlap amount and/or image missing amount and an adjustment amount of a distance between the light receiving sensors and document is defined in advance.

(7) The image reading device of Item. 6, wherein the image overlap amount and/or image missing amount and the adjustment amount defined in the table are preferably in a proportional relation.

(8) The image reading device of Item. 4 or 5, wherein after displacing at least one of the document conveying rollers and light receiving sensors by the drive unit, the detection of an image overlap amount and/or image missing amount by the detection unit, the adjustment amount determination by the adjustment amount determination unit, and the display of the necessary displacement amount on the display unit can be preferably executed once or repeated more than once, and when the adjustment amount determined by the adjustment amount determination unit becomes zero, the display unit preferably displays that the necessary displacement amount is zero.

(9) To achieve the abovementioned object, according to an aspect, there is provided a method of adjusting a distance between a document and light receiving sensors executed in an image reading device comprising: a plurality of light receiving sensors, which use an optical shrink system, configured to read an image of a document conveyed in a sub-scanning direction and be arranged at intervals in a main scanning direction, the plurality of light receiving sensors arranged so that border parts of reading areas of adjacent two of the light receiving sensors in a main scanning direction correspond to each other on or near a reference conveyance plane of the document; and at least one pair of document conveying rollers configured to be provided in front and back of the plurality of light receiving sensors in a document conveying direction, and the method reflecting one aspect of the present invention comprises: an overlap amount/missing amount detection step of detecting an image overlap amount in an image overlap area which occurs when a part of the document in a main scanning direction is redundantly read by adjacent two of the light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensors, from a plurality of parts in the main scanning direction of the image data of the document read by the light receiving sensors; an adjustment amount determination step of determining an adjustment amount used to adjust a distance between the document and the light receiving sensors in at least one part of the document in the main scanning direction based on the image overlap amount and/or image missing amount detected in the overlap amount/missing amount detection step; and a driving step of adjusting a distance between the document and the light receiving sensors by displacing at least one of the document conveying rollers and light receiving sensors according to the adjustment amount determined in the adjustment amount determination step.

(10) To achieve the abovementioned object, according to an aspect, there is provided a non-transitory recording medium storing a computer readable program for adjusting a distance between a document and light receiving sensors, and the program reflecting one aspect of the present invention causes a computer of an image reading device comprising: a plurality of light receiving sensors, which use an optical shrink system, configured to read an image of a document conveyed in a sub-scanning direction and be arranged at intervals in a main scanning direction, the plurality of light receiving sensors arranged so that border parts of reading areas of adjacent two of the light receiving sensors in a main scanning direction correspond to each other on or near a reference conveyance plane of the document; and at least one pair of document conveying rollers configured to be provided in front and back of the plurality of light receiving sensors in a document conveying direction to execute: a detection step of detecting an image overlap amount in an image overlap area which occurs when a part of the document in a main scanning direction is redundantly read by adjacent two of the light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensors, from a plurality of parts in the main scanning direction of the image data of the document read by the light receiving sensors; a determination step of determining an adjustment amount for adjusting a distance between the document and the light receiving sensors in at least one part of the document in the main scanning direction based on the image overlap amount and/or image missing amount detected in the overlap amount/missing amount detection step; and an adjusting step of adjusting a distance between the document and the light receiving sensors by displacing at least one of the document conveying rollers and light receiving sensors according to the adjustment amount determined in the adjustment amount determination step.

(11) The non-transitory recording medium storing a computer readable program of Item. 10, wherein in the detection step, in the border parts of the image data read by the adjacent light receiving sensors, a number of pixels in the main scanning direction of a region, which is different from a region of an expected value of image data having no image overlap area or image missing area, is preferably detected as the image overlap amount and/or image missing amount.

(12) The non-transitory recording medium storing a computer readable program of Item. 10 or 11, wherein the plurality of document conveying rollers are preferably arranged at intervals in the main scanning direction of the document, and in the adjusting step, when an image overlap amount is detected, the document conveying roller located near the image overlap area of the document is preferably displaced so that the distance between the document face and the light receiving sensors becomes smaller and, when an image missing amount is detected, the document conveying roller located near the image missing area of the document so that the distance between the document face and the light receiving sensors preferably becomes larger.

(13) The non-transitory recording medium storing a computer readable program of any one of Items. 10 to 12, the program preferably further causing the computer to execute a displaying step of displaying a necessary displacement amount of at least one of the document conveying rollers and light receiving sensors in the adjusting step, wherein the displacement of at least one of the document conveying rollers and the light receiving sensors in the adjusting step is preferably manually operated based on the displayed necessary displacement amount.

(14) The non-transitory recording medium storing a computer readable program of any one of Items. 10 to 12, the program preferably further causing the computer to execute a displaying step of displaying a necessary displacement amount of at least one of the document conveying rollers and the light receiving sensors in the adjusting step, wherein the displayed necessary displacement amount is preferably a displacement amount to instruct an automatic control in the adjusting step.

(15) The non-transitory recording medium storing a computer readable program of any one of Items. 10 to 14, wherein in the determination step, an adjustment amount is preferably determined by converting the image overlap amount and/or image missing amount detected in the detection step into a corresponding adjustment amount with reference to a table in which a relationship between the image overlap amount and/or image missing amount and an adjustment amount of a distance between the light receiving sensors and the document is defined in advance.

(16) The non-transitory recording medium storing a computer readable program of Item. 15, wherein the image overlap amount and/or image missing amount and the adjustment amount defined in the table are preferably in a proportional relation.

(17) The non-transitory recording medium storing a computer readable program of Item. 13 or 14, wherein after displacing at least one of the document conveying rollers and the light receiving sensors in the adjusting step, the detection of the image overlap amount and/or image missing amount in the detection step, the adjustment amount determination in the determining step, and a display of the necessary displacement amount in the displaying step can be preferably executed once or repeated more than once, and when the adjustment amount determined in the determining step becomes zero, it is preferably displayed that the necessary displacement amount is zero in the displaying step.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 3 is a diagram schematically illustrating a configuration of the image reading unit, as seen from an upstream side of a sub-scanning direction (document conveying direction);

FIG. 9A is an image overlap amount detection chart;

FIG. 9B is image data acquired when the chart of FIG. 9A is read in a condition that there is no overlap area or missing area;

FIG. 9C is image data acquired when the chart of FIG. 9A is read in a condition that an image overlap area has occurred;

FIG. 10 is a graph for explaining a relationship between measured values of gradation levels of the image data acquired when the chart of FIG. 9A is read while there is an overlap area and expected values of gradation levels when there is no overlap area;

FIG. 16 is a diagram illustrating a screen displayed on a display unit after the adjustment amount of the conveying roller is determined;

FIG. 17 is a screen displayed when a user presses a "Yes" button on the screen of FIG. 16;

FIG. 18 is a screen displayed when the user presses a "No" button on the screen of FIG. 16;

FIG. 23A is a diagram for explaining a situation that an image overlap area or an image missing area occurs; and FIG. 23B is a diagram for explaining a situation that an image overlap area or an image missing area occurs when a wavy document is conveyed in a main scanning direction.

DESCRIPTION OF THE PREFERRED EMBODIMENTS

Hereinafter, an embodiment of the present invention will be described with reference to the drawings. However, the scope of the invention is not limited to the illustrated examples.

Figure 1:
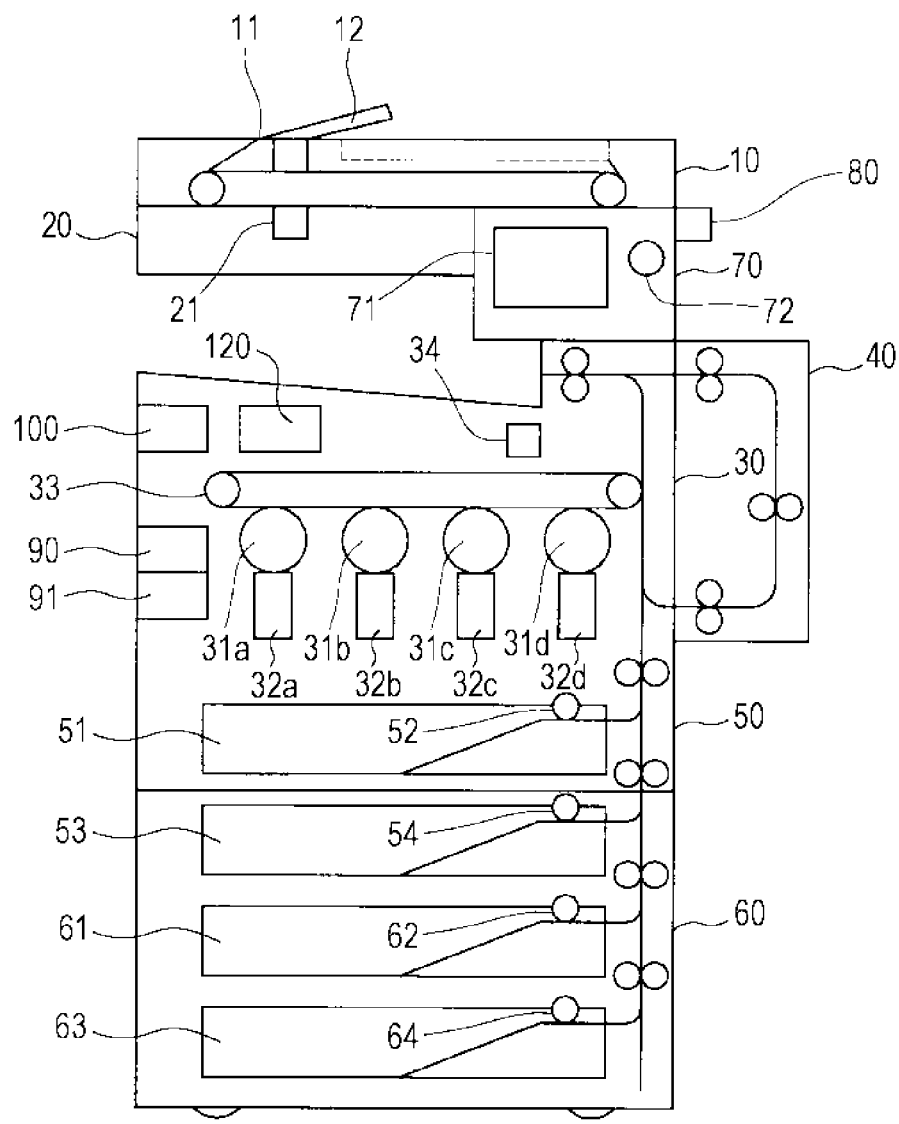
FIG. 1 is a diagram illustrating an overall configuration of an image forming apparatus provided in an image reading device according to an embodiment of the present invention.

FIG. 1 is a diagram illustrating an overall configuration of an image forming apparatus in which an image reading device according to an embodiment of the present invention is provided. As illustrated in FIG. 1, the image forming apparatus includes an automatic document feeder 10, an image reading unit 20 as the image reading device, an image forming unit 30, an automatic duplexing unit 40, a sheet feeder 50, a sheet cabinet 60, an operation panel 70, a facsimile unit 90, a communication interface (I/F) unit 91, a control unit 100, a memory unit 120, and the like.

The automatic document feeder 10 is a known device that automatically conveys a plurality of sheets of document set on a document feeding tray 12 one by one to a predetermined document reading position on a platen glass, which is a reading glass of the image reading unit 20 and discharges the document onto a document discharge tray when the document image is read by the image reading unit 20. Further, the automatic document feeder 10 includes a document set sensor 11, and the document set sensor 11 is configured with a known tact switch to detect whether or not a document is set and transmits the result to the control unit 100 as a signal.

The image reading unit 20 is a device that scans document image according to a size of the document conveyed to the document reading position, receives a reflected light, as an incident light, of light illuminated to the document image from a light source, converts the incident light into an electrical signal, and transmits the electrical signal to the control unit 100 as image data. Further, the image reading unit 20 includes a device lift sensor 21, and the device lift sensor 21 is configured with a known magnetic sensor, detects whether or not the automatic document feeder 10 is being lifted, and transmits the result to the control unit 100 as a signal.

The operation panel 70 is a known user interface and includes a display unit 71 which also serves as a touch panel input unit and a key input unit 72. Further, the operation panel 70 includes a secondary power switch 80. The secondary power switch 80 is a switch to directly instructs, by a user, to shift to a sleep mode, which is a power saving operation mode.

The control unit 100 includes a CPU, a ROM, and a RAM, performs various processes on data such as a shading correction on the received read data, and integrally controls the overall image forming apparatus by outputting a signal to drive a laser diode as reading each main scanning line in a synchronization with feeding of the sheet, for example. Further, according to the present embodiment, a control needed to adjust a position of at least one of a CCD sensor serving as a light receiving sensor and a document conveying roller is performed, and this control will be described later.

The facsimile unit 90 is an interface, which is connected to a public telephone line to transmit and receive image data.

The communication I/F unit 91 is an interface to be connected to an external network to which a personal computer or the like is connected. As the external network, a LAN or a USB is used.

The memory unit 120 stores image data and other data transmitted from the control unit 100 and is configured with a hard disk drive (HDD) for example.

The image forming unit 30 forms an image by using a known electrographic system, and includes photoconductor drums 31a, 31b, 31c, and 31d, exposure scanning units 32a, 32b, 32c, and 32d, a transfer belt 33, an unillustrated front cover which protects the unit, and a front cover sensor 34. Further, the image forming unit 30 is compatible with four colors including yellow, magenta, cyan, and black. Based on a drive signal output from the control unit 100, laser lights generated in the exposure scanning units 32a, 32b, 32c, and 32d are exposure scanned on the respective photoconductor drums 31a, 31b, 31c, and 31d. The front cover sensor 34 is configured with a known tact switch, detects whether or not the front cover is open, and transmits the result to the control unit 100 as a signal. The transfer belt 33 transfers toner images on the photoconductor drums 31a, 31b, 31c, and 31d corresponding to the respective colors on a sheet conveyed from the sheet feeder 50, as overlapping all of the images.

The sheet feeder 50 includes sheet cassettes 51 and 53 for containing sheets of paper, pickup rollers 52 and 54 for feeding the sheets of paper, and supplies the sheets of paper to the image forming unit 30.

Similarly to the sheet feeder 50, the sheet cabinet 60 includes sheet cassettes 61 and 63 for containing sheets of paper and pickup rollers 62 and 64 for feeding the sheets of paper, and supplies the sheets of paper to the image forming unit 30 via the sheet feeder 50.

The automatic duplexing unit 40 performs a switchback of a sheet on a sheet path to reverse the front side and rear side of the sheet, on which printing has been performed on one side, to refeed the sheet to realize duplexing printing.

Figure 2:
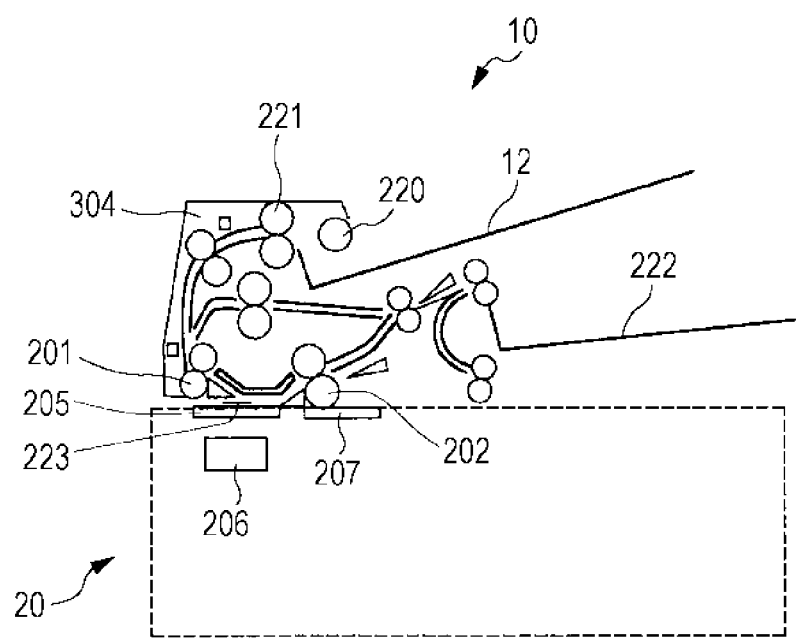
FIG. 2 is a diagram schematically illustrating overall configurations of an automatic document feeder and an image reading unit, as seen from a front side of the image forming apparatus.

FIG. 2 is a diagram schematically illustrating overall configurations of the automatic document feeder 10 and image reading unit 20 as seen from a front side of the image forming apparatus.

The automatic document feeder 10 is an automatic document feeding device of a sheet-through type and conveys a sheet to be scanned to the image reading unit 20. Further, the automatic document feeder 10 may include a function to scan a rear side of the sheet.

The image reading unit 20 reads an image on the sheet which is conveyed by the automatic document feeder 10 and generates image data.

As illustrated in FIG. 2, the image reading unit 20 includes a reading unit 206 having alight receiving sensor, a platen glass 205, a shading sheet 207, and an exposing device (not shown), and reads the image on a document.

On the other hand, the automatic document feeder 10 includes a sheet feeding roller 220, a separating roller 221, and a pre-reading conveying roller 201 and, with these rollers, the original set on the document feeding tray 12 is conveyed to a reading position. The reading unit 206 generates image data by using RGB data. In a vicinity of the reading position, a post-reading conveying roller 202 is provided in downstream of the original conveying direction, and the document which has passed through the reading position is conveyed by the post-reading conveying roller 202 to downstream and discharged to a discharge stack tray 222. Here, at the reading position, the document is led by a conveyance guide member 223 so as to be conveyed without contacting with the platen glass 205. Further, the post-reading conveying roller 202 is made to rotate slightly faster than the pre-reading conveying roller 201 so that the document is pulled to avoid a contact with the platen glass 205 due to a slack of the document. When there is a foreign object such as a paper dust and an adhesive object on the platen glass 205 at the reading position, the foreign object stays at the reading position and causes a colored line-shaped noise in the document conveying direction. As described above, an appearance of a foreign object on the platen glass 205 mainly caused by a contact between the document and the platen glass 205 can be prevented by avoiding the contact between the document and the platen glass 205. Further, although it is not illustrated, a guide member for preventing an inclination of a sheet while the sheet is fed is provided to the document feeding tray 12 of the automatic document feeder 10, and a size of the document on the sheet feeding tray 200 can be determined in a combination of a position detecting sensor linked to the guide member and a plurality of document detecting members provided in the conveying direction of the sheet feeding tray. Further, when a shading correction is periodically performed during a job, the reading unit 206 moves to a position of the shading sheet 207 and performs shading.

FIG. 3 is a diagram schematically illustrating the configuration of the reading unit 206 of FIG. 2, as seen from an upstream side in a sub-scanning direction (document conveying direction).

In the same drawing, the reference numeral 205 represents the platen glass. As descried above, since the document is conveyed by the automatic document feeder 10 as keeping a small space from the platen glass 205, there is a document conveyance plane, above the platen glass 205, where the document passes through. According to the present embodiment, a target document conveyance plane where the document passes through is set as a reference conveyance plane 250 and the reference conveyance plane 250 is at a position P1 in a vertical direction.

Under the platen glass 205, a CCD sensors (also simply referred to as CCDs) 1 to N serving as a plurality of light receiving sensors of an optical shrink system for optically receiving a reduced image via lenses 261 to 26N are provided at intervals so as to dividedly read an image on a read face of the document in the main scanning direction (the right and left direction in FIG. 3). The reference numerals 270 of FIG. 3 represent reflected lights of a light illuminated from an unillustrated exposing device toward the document.

Further, according to the present embodiment, border parts of reading areas of the two adjacent CCDs correspond to each other on the reference conveyance plane 250 in the main scanning direction. Thus, when the document passes completely through the reference conveyance plane 250, an image overlap area (hereinafter, also simply referred to as an overlap area) in which both of the adjacent two CCDs read the image and an image missing area (hereinafter, also simply referred to as a missing area) in which none of the adjacent two CCDs reads the image are not caused on the document. Here, the border parts of the reading areas of the adjacent two CCDs in the main scanning direction may be placed so that the border parts correspond to each other slightly under the reference conveyance plane 250. When the document is conveyed on the reference conveyance plane 250 in this manner, only an overlap area caused by that the image is read by the adjacent two CCDs redundantly is caused.

Here, the CCDs 1 to N are composed of each channel of RGB arranged in a sub-scanning direction, which is the document conveying direction, or each channel of RGB and a channel of Gr.

Figure 4A:
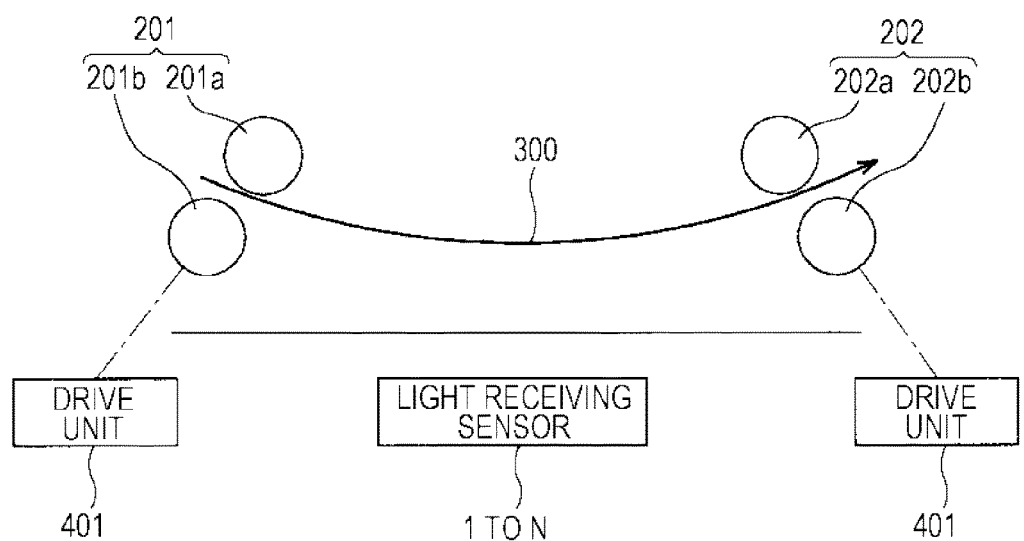
FIG. 4A is a diagram schematically illustrating an arrangement condition of pre-reading conveying rollers and post-reading conveying rollers, as seen from a front side of the image forming apparatus.
Figure 4B:
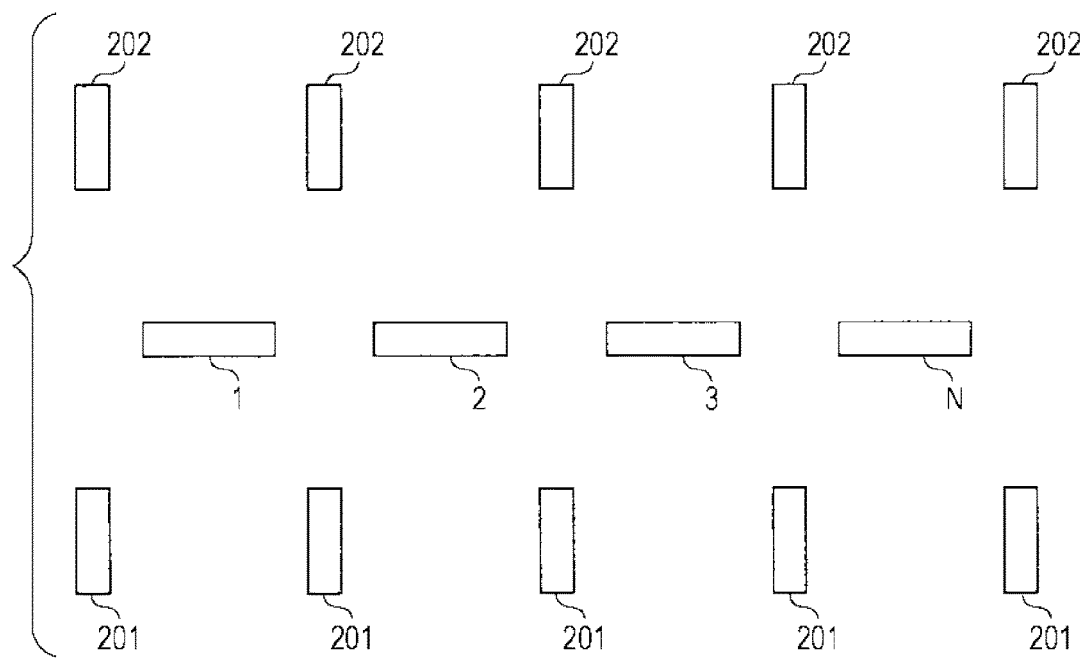
FIG. 4B is a diagram schematically illustrating the arrangement condition with an upstream side of the document conveying direction in the bottom of the drawing, as seen from an upper side of the image forming apparatus.

FIG. 4A is a diagram schematically illustrating an arrangement state of the pre-reading conveying roller 201 and post-reading conveying roller 202 as seen from the front side of the image forming apparatus, and FIG. 4B is a diagram schematically illustrating the same arrangement state as seen from the upper side of the image forming apparatus as illustrating the upstream of the document conveying direction in the bottom of the drawing.

The pre-reading conveying roller 201 is composed of an upper roller 201a and a lower roller 201b, the post-reading conveying roller 202 is composed of an upper roller 202a and a lower roller 202b, and the document 300 is conveyed to be passed through between the respective upper rollers 201a and 202a and the lower rollers 201b and 202b of the pre-reading conveying roller 201 and post-reading conveying roller 202.

Further, as a pair of the pre-reading conveying roller 201 and the post-reading conveying roller 202, a plurality of pairs are arranged in the main scanning direction (the right and left direction of the sheet in FIG. 4B) at intervals. Concretely, the pairs are provided in the middle between the adjacent light receiving sensors 1 to N and at outsides of the light receiving sensors 1 and N placed at the both ends, and the document is conveyed by the plurality of pairs of the pre-reading conveying roller 201 and post-reading conveying roller 202.

Further, as illustrated in FIG. 4A, one pair of the pre-reading conveying roller 201 and post-reading conveying roller 202 is configured to be integrally movable in up and down direction via a drive unit 401 and each pair of the respective pairs are configured independently in a linked manner. Then, by moving, via the drive unit 401, upward or downward the respective upper rollers 201a and 202a and lower rollers 201b and 202b of the necessary pre-reading conveying roller 201 and post-reading conveying roller 202 among the plurality of pairs of pre-reading conveying roller 201 and post-reading conveying roller 202, the document can be conveyed as being separated from or made closer to the platen glass 205. In other words, the distance between the document 300 and the light receiving sensors 1 to N at the timing of reading the document can be partially adjusted in the main scanning direction.

Here, according to the embodiment, it is configured that the upward and downward movements of the pre-reading conveying roller 201 and post-reading conveying roller 202 by the drive unit 401 can be manually performed by a user or performed by an automatic control by the image forming apparatus.

Figure 5:
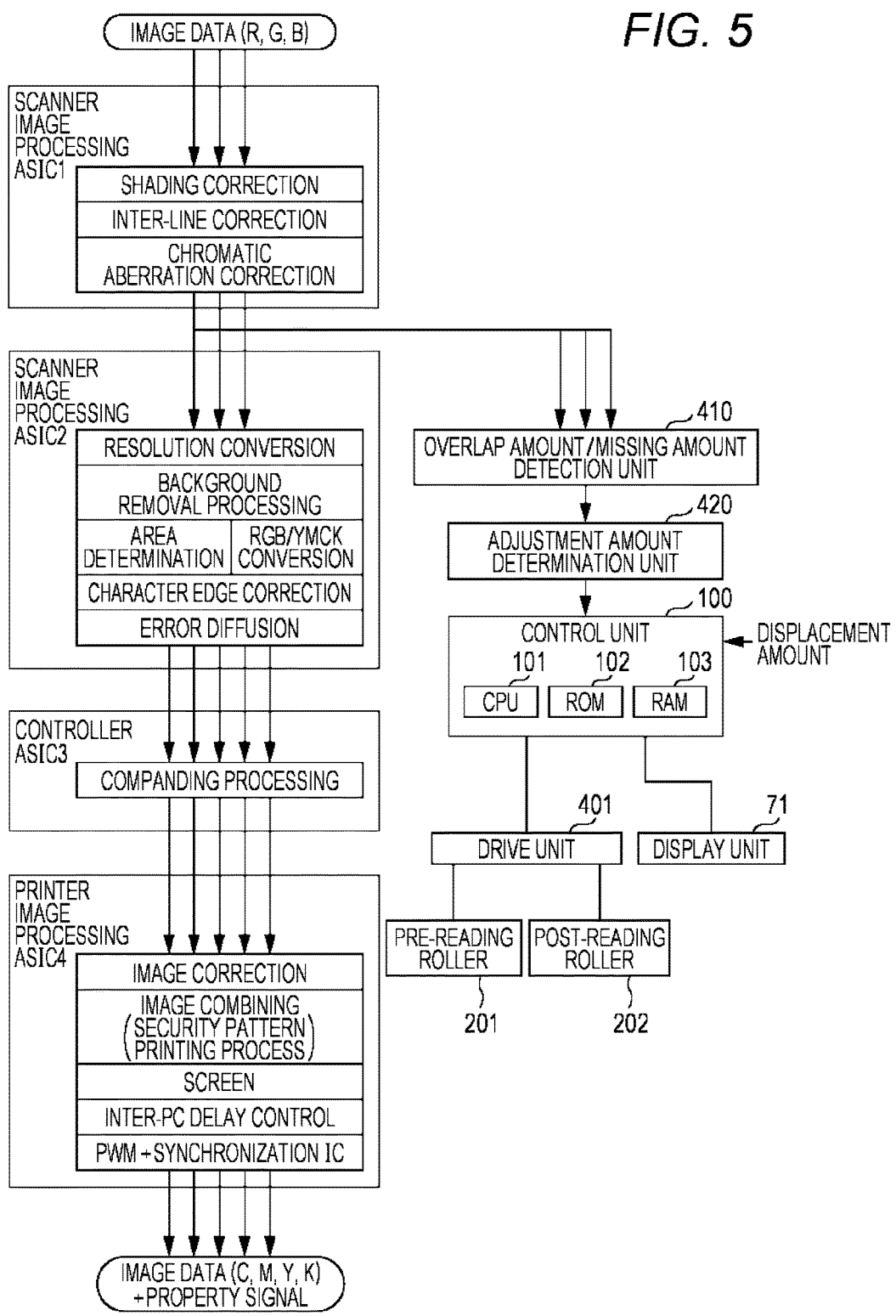
FIG. 5 is a block diagram illustrating a configuration of main parts of the image forming apparatus.

FIG. 5 is a block diagram illustrating a configuration of a main part of the image forming apparatus.

The RGB image data read by the light receiving sensors 1 to N is firstly performed with a shading correction, an inter-line correction, chromatic aberration correction in a scanner image processing ASIC1, and then transmitted to the scanner image processing ASIC2. In the scanner image processing ASIC2, a process for converting the RGB image data into CMYK data is executed as well as processes including resolution conversion, background removal processing, area determination, character edge correction, and error diffusion.

Next, a companding processing is performed on the CMYK data, which is processed in the scanner image processing ASIC2, respectively in a controller ASIC3 and the data is transmitted to a print image processing ASIC4.

In the print image processing ASIC4, processes such as image correction, pattern printing, screen, inter-PC delay control, and the like are performed to convert the data into printing image data.

On the other hand, the image data processed in the scanner image processing ASIC1 is input to an overlap amount/missing amount detection unit 410, and the overlap amount/missing amount detection unit 410 detects an image overlap amount (hereinafter, also referred to as an overlap amount) and/or an image missing amount (hereinafter, also referred to as a missing amount).

When the document 300 is conveyed at a position apart from the reference conveyance plane 250 in a direction that the distance from the light receiving sensors 1 to N becomes larger, a part of the document in the main scanning direction is redundantly read by adjacent two of the light receiving sensors and this causes an image overlap area. Further, when the document 300 is conveyed at a position apart from the reference conveyance plane 250 so that the distance from the light receiving sensors becomes smaller, apart of the document in the main scanning direction is not read by any of the adjacent two light receiving sensor and this cases an image missing area. The overlap amount/missing amount detection unit 410 detects an image overlap amount in the image overlap area and/or an image missing amount in the image missing area. The detailed detection method will be described later.

The image overlap amount and/or the image missing amount detected by the overlap amount/missing amount detection unit 410 is input to an adjustment amount determination unit 420. The adjustment amount determination unit 420 determines an adjustment amount of adjusting a distance between the document and the light receiving sensors 1 to N at a position where an image overlap area or an image missing area has occurred, based on the image overlap amount and/or image missing amount. This determination is performed with reference to a later describe table, which is created and stored in the memory unit 120 or the like in advance.

The control unit 100 controls, via the drive unit 401, to displace upward or downward the necessary pre-reading conveying roller 201 and post-reading conveying roller 202 according to the adjustment amount determined by the adjustment amount determination unit 420. The control unit 100 includes a CPU 101, a ROM 102, and a RAM 103. The CPU 101 is used to control in actual, and the ROM 102 is to store an operation program and the like of the CPU 101, and the RAM 103 provides a work area when the CPU 101 performs operations.

Here, the displacements of the pre-reading conveying roller 201 and post-reading conveying roller 202 may be manually performed by the user by using the drive unit 401. In this case, the control unit 100 displays a necessary displacement amount on the display unit 71 of the operation panel 70. The displayed necessary displacement amount may be the adjustment amount, which is determined by the adjustment amount determination unit 420, as it is or may be an operation amount corresponding to the adjustment amount in a case where an operation member is operated for example. Further, there may be a configuration that the user inputs information of the necessary displacement amount displayed on the display unit 71 to the control unit 100 to instruct an automatic adjustment and the control unit 100 controls the displacement of the pre-reading conveying roller 201 and post-reading conveying roller 202 via the drive unit 401.

Here, the overlap amount/missing amount detection unit 410 and adjustment amount determination unit 420 may be configured as one of the functions of the CPU 101 of the control unit 100.

Next, the image overlap amount and/or image missing amount detection method by the overlap amount/missing amount detection unit 410 will be described.

According to the present embodiment, the detection is performed by conveying a document of detecting chart and reading the document with the light receiving sensors 1 to N (the four light receiving sensors 1 to 4 in this example). Further, the image overlap amount and/or image missing amount detection, adjustment amount determination, displacement adjustment of the pre-reading conveying roller 201 and post-reading conveying roller 202 are performed during maintenance when or after the image forming apparatus is shipped from a factory, although it is not limited to this manner.

Figure 6A:
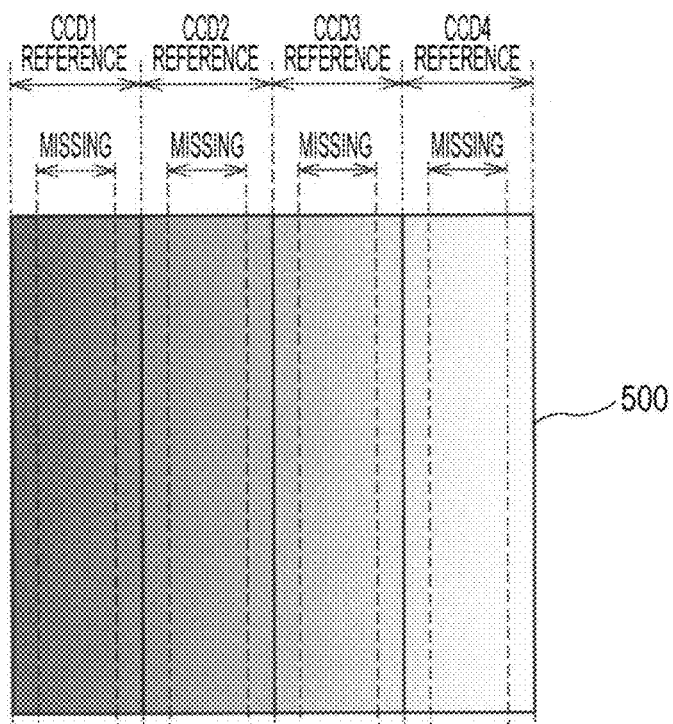
FIG. 6A is an image missing amount detection chart.

FIG. 6A illustrates an image missing amount detection chart 500. On this chart, a gradation image in which gradation sequentially changes from an end toward another end of a sheet in a width direction (a main scanning direction). When the document (chart 500) passes through the reference conveyance plane 250, an image overlap area or an image missing area between adjacent light receiving sensors does not occur. Border lines of areas read by the respective light receiving sensors 1 to N are illustrated with continuous lines in FIG. 6A for the sake of convenience and the areas divided by the continuous lines (represented as a CCD1 reference, a CCD2 reference, . . . ) are the areas to be read by the respective light receiving sensors (CCDs) 1 to N. Here, when the document is conveyed a position closer to the light receiving sensors 1 to N than the reference conveyance plane 250, an image missing area where is not read by any of the two adjacent light receiving sensors occurs. In this case, the areas indicated as missing in FIG. 6A are the areas to be read by the respective light receiving sensors 1 to N.

Figure 6B:
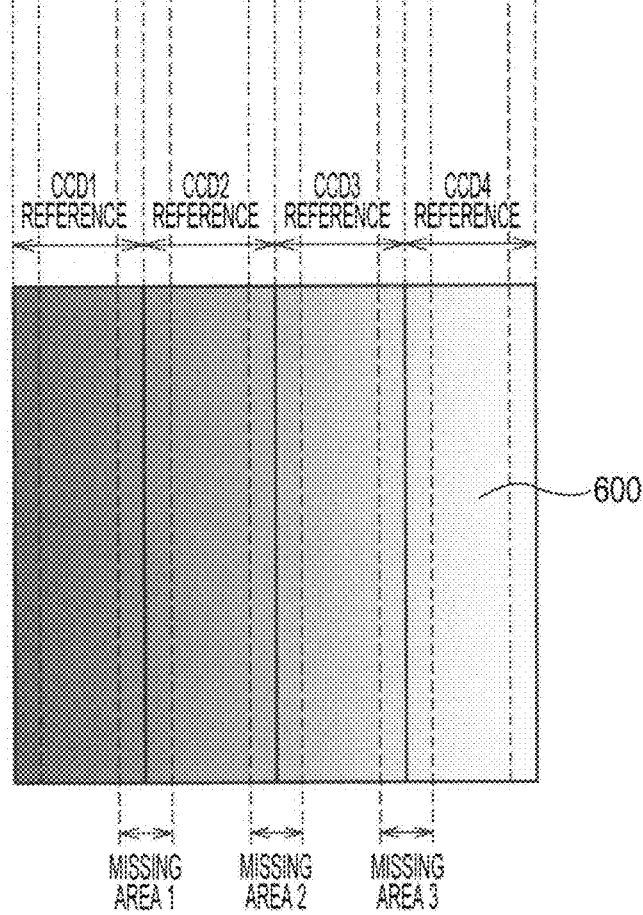
FIG. 6B is image data in a case where the chart of FIG. 6A is read in a condition that an image missing area has occurred.

The image data acquired from the respective light receiving sensors 1 to N when there is an image missing area becomes the image data 600 as illustrated in FIG. 6B. In the image data 600, since there are image missing areas 1 to 3 due to the adjacent light receiving sensors 1 to N, a gradation difference occurs in an originally expected image data having a sequential gradation at a border part obtained by the light receiving sensors 1 to N.

Figure 7:
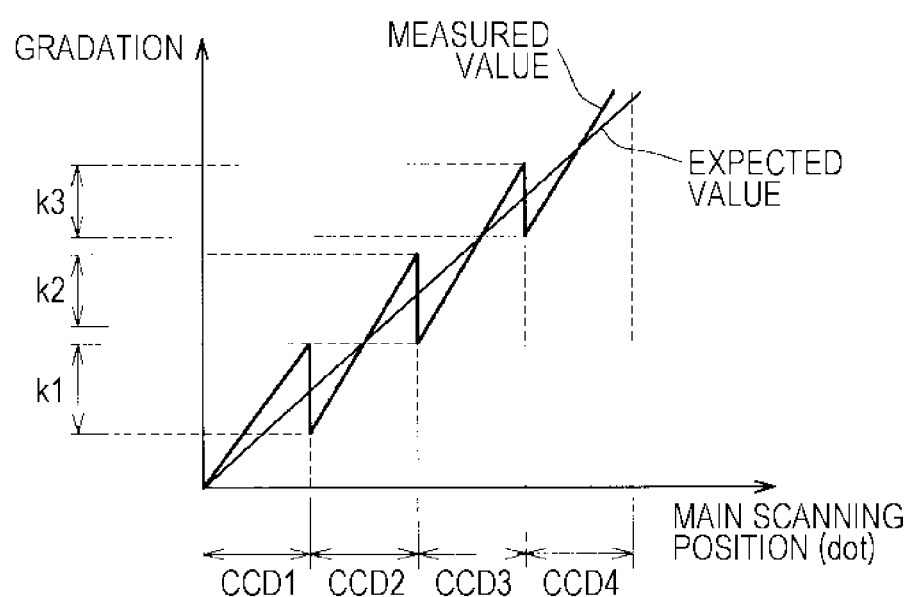
FIG. 7 is a graph illustrating a relationship between positions in a main scanning direction (main scanning positions), which are defined by a number of pixels (dots), and gradation levels, in image data acquired when the chart of FIG. 6A is read, in a case where there is no image missing area and a case where an image missing area exists.

FIG. 7 is a graph illustrating a relationship between positions (main scanning positions) in a main scanning direction defined by number of pixels (dots) and gradation levels in the image data acquired by reading the chart illustrated in FIG. 6A, in a case where there is an image missing area and a case where there is no image missing area.

The gradation level of the image data acquired when there is no missing area changes as a continuous straight line with respect to the main scanning positions as illustrated as an expected value in the same drawing. On the other hand, the gradation when there are missing areas 1 to 3 changes as an discontinuous sawtooth waveform in the border parts of the adjacent light receiving sensors 1 to N as illustrated as a measured value in the same drawing.

When the gradation differences generated at each border part of the adjacent light receiving sensors 1 to N are referred to as K1, K2, and K3 from an end, the gradation differences K1, K2, and K3 become twice as the difference between the expected value and measured value at each border part of the adjacent light receiving sensors 1 to N. Thus, the graduation level in each border part of the adjacent light receiving sensors 1 to N is measured and a value twice of the pixels corresponding to a difference between a measured graduation value (measured value) and an expected value is detected as an image missing amount.

Figure 8A:
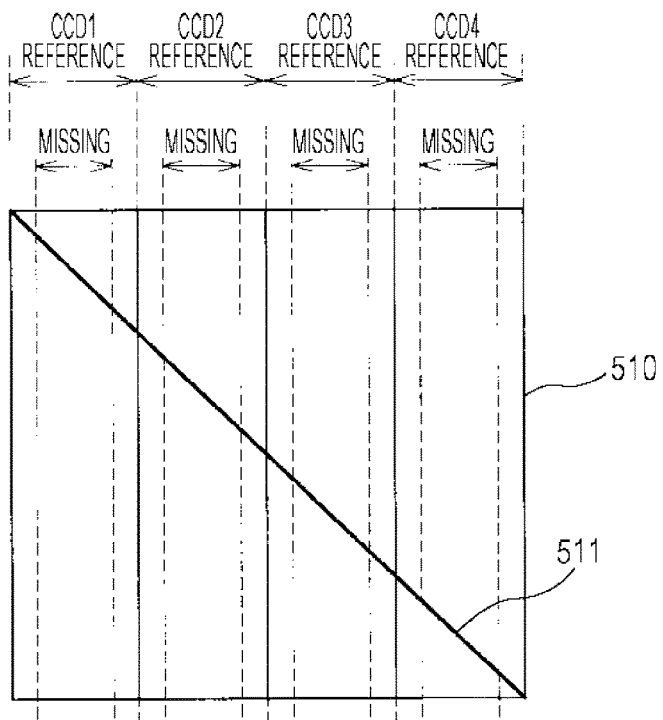
FIG. 8A is another chart for an image missing amount detection.

FIG. 8A illustrates another chart 510 used for an image missing amount detection. In this chart, straight line 511 is crossly illustrated from one upper corner toward another lower corner of the sheet in the width direction (the main scanning direction). When the document passes through the reference conveyance plane 250, an image overlap or an image missing do not occur between the adjacent light receiving sensors. Border lines of areas to be read by the respective light receiving sensors 1 to N at that time are illustrated continuous lines in FIG. 8A for the sake of convenience, and the areas (represented by CCD reference 1, . . . ) divided by the continuous lines are the areas to be read by the respective light receiving sensors (CCD) 1 to N. Here, when the document is conveyed apart from the reference conveyance plane 250 and closer to the light receiving sensors 1 to N, a missing area, which is not read by any of the adjacent two light receiving sensors, occurs. In this case, the areas defined as missing in FIG. 8A are the areas to be read by the respective light receiving sensors 1 to N.

Figure 8B:
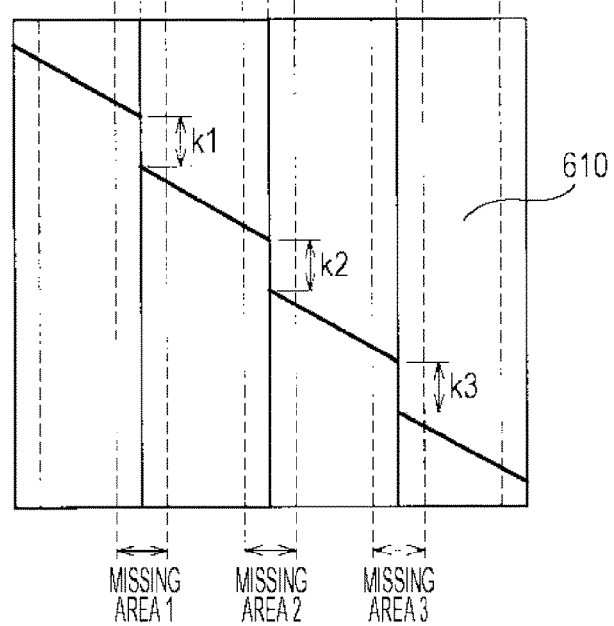
FIG. 8B is image data, which is acquired when the chart of FIG. 8A is read in a condition that an image missing area has occurred.

The image data acquired from the respective light receiving sensors 1 to N in a case the missing area occurs becomes an image data 610 as illustrated in FIG. 8B. In the image data 610, because of the missing areas 1 to 3, the stepped parts K1, K2, and K3 in the border parts of the image data acquired from the respective light receiving sensors 1 to N. Then, the number of pixels corresponding to the stepped parts K1, K2, and K3 may be detected as an image missing amount.

FIG. 9A illustrates an image overlap amount detection chart 520. In this chart, for example, two types of images P and Q in different gradation levels, such as black and white, are formed alternately from one end to the other end in the width direction (main scanning direction) of the sheet all over the area in the sub-scanning direction of the document. The length of each images P, Q in the main scanning direction is set as same as the length of the reading area of the respective light receiving sensors 1 to N when there is no missing area or overlap area between the adjacent light receiving sensors 1 to N. Here, the images P, Q are not limited to the two types as long as images having a greater color density and images having a less color density are provided alternately in the main scanning direction.

When the document passes through the reference conveyance plane 250, an image overlap area or an image missing area may not occur. The areas (represented as CCD reference 1, etc.) divided with the continuous lines in FIG. 9A are the areas to be read by the respective light receiving sensors (CCD) 1 to N. Here, when the document is conveyed apart from the reference conveyance plane 250 as being away from the light receiving sensors 1 to N, the areas indicated as overlap in FIG. 9A become the areas to be read by the respective light receiving sensors 1 to N. In this case, overlap areas, which are read by both adjacent two light receiving sensors, is generated.

FIG. 9B illustrates image data 620 acquired from the respective light receiving sensors 1 to N when there is no overlap area or missing area has occurred. In this image data, the border parts of the images P and Q in the chart 520 correspond to the border parts of the image data 620 read by the respective light receiving sensors 1 to N. On the other hand, when an overlap area occurs, image data 621 illustrated in FIG. 9C is acquired. In the image data 621, since the light receiving sensors 1 and 3 that read the images P also read the images Q, which are adjacent to the images P in the chart 520 and the light receiving sensors 2 and 4 that read the images Q also read the images P, which are adjacent to the image P in the chart 520, read data 621Q of the image Q and read data 621P of the image P occur alternately in the respective overlap areas 1 to 3.

FIG. 10 illustrates a graph for explaining a relationship between measured values of gradation levels of the image data, which is acquired when the document illustrated in FIG. 9A is read in a case where there is an overlap area, and expected values of gradation level when there is no overlap area. The lower horizontal lines represent measured values and the upper horizontal liens represent expected values.

In the border parts of the respective adjacent light receiving sensors 1 to N, the measured values of the graduation levels of the part in which there are read data 621Q of the image Q and read data 621P of the image P differ from the expected values of a case where there is no image overlap.

Thus, the number of pixels (the number of dots) in the areas in which the measured values of the gradation level are different from the expected values are counted and image overlap amounts J1, J2, and J3 are detected.

Figure 11A:
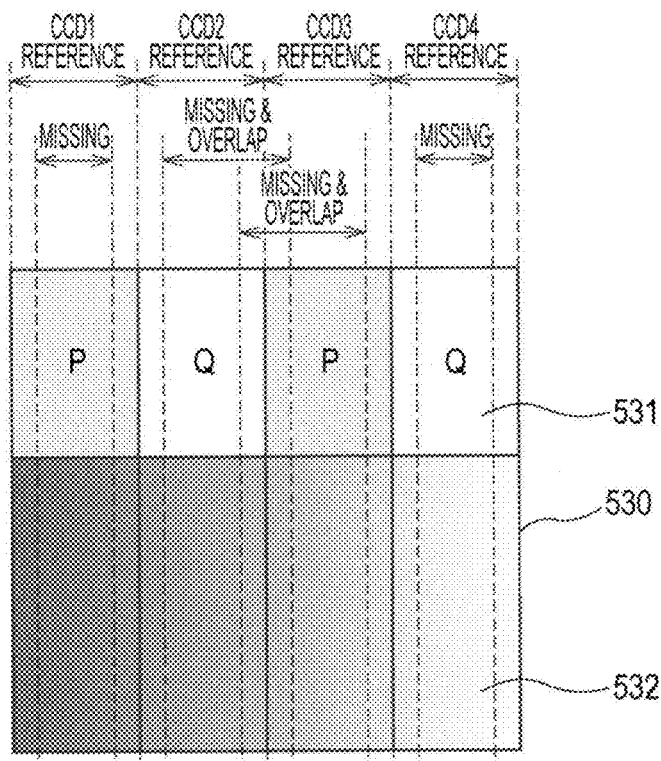
FIG. 11A is a chart used to detect an image missing amount and an image overlap amount at the same time.

FIG. 11A illustrates a chart 530 used for a simultaneous detection of an image missing amount and an image overlap amount. In this chart, there are an image missing amount detection image 532 in a rear part of the sheet in the sub-scanning direction and an image overlap amount detection image 531 in a front part, respectively. The image missing amount detection image 532 in the rear part is same as the image of the chart 500 illustrated in FIG. 6A and is composed of a gradation image in which the gradation level sequentially changes from one end to the other end in the width direction (main scanning direction) of the sheet.

On the other hand, the image overlap amount detection image 531 in the front part is same as the image of the chart 520 illustrated in FIG. 9A, in which two types of images P and Q in a different gradation levels are formed alternately from one end to the other end in the width direction (main scanning direction) of the sheet.

In this example, image missing areas occur respectively in the reading border parts between the light receiving sensor 1 and the light receiving sensor 2 and between the light receiving sensor 3 and the light receiving sensor 4, and an image overlap area occurs in the reading border part between the light receiving sensor 2 and the light receiving sensor 3.

Figure 11B:
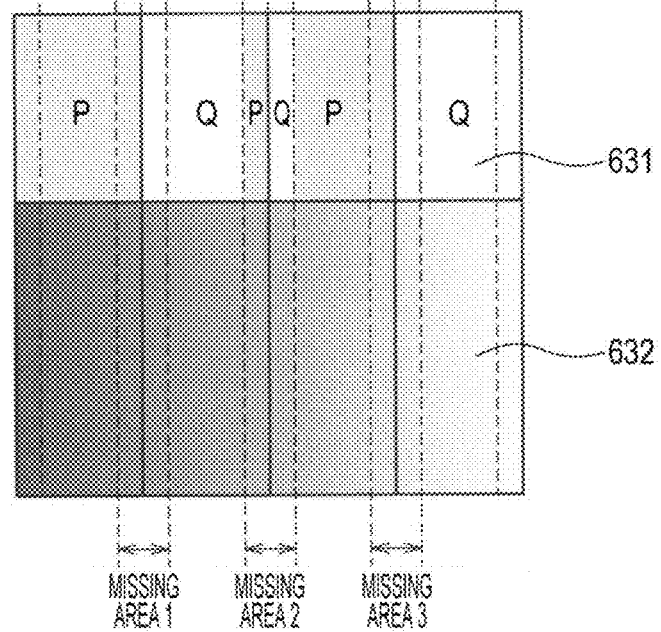
FIG. 11B is image data acquired by reading the chart of FIG. 11A in a condition that an image overlap area and an image missing area exist.

FIG. 11B illustrates image data in a case where the chart 530 of FIG. 9A is read when an image overlap area and an image missing area have been generated. Since the detection of the image missing amount and image overlap amount is same as the image missing amount detection explained in FIGS. 6A, 6B and 7 and the image overlap amount detection explained in FIGS. 9A to 9C and 10, the explanation thereof will be omitted.

Figure 12:
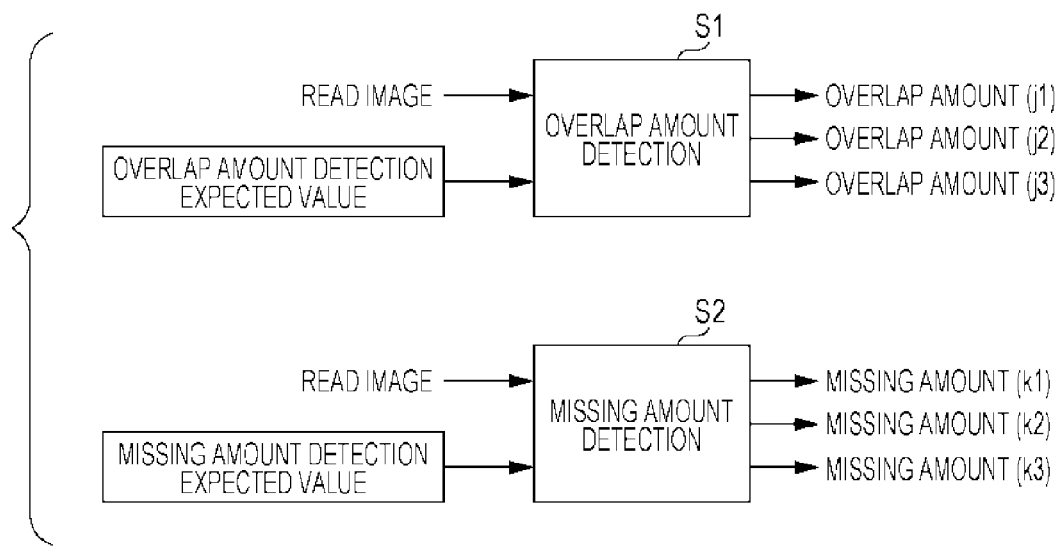
FIG. 12 is a diagram for explaining a detection process of an overlap amount and a missing amount by an overlap amount/missing amount detection unit.

FIG. 12 is a diagram illustrating an overlap amount/missing amount detection process by the overlap amount/missing amount detection unit 410 of FIG. 5. As described above, insteps S1 and S2, the overlap amount/missing amount detection unit 410 detects image overlap amounts (j1) to (j3) or image missing amounts (k1) to (k3) caused by adjacent light receiving sensors in a plurality of parts in the main scanning direction, based on the gradation level of the read image data in the reading border part of the adjacent light receiving sensors and expected values of a case where there is no overlap area or missing area.

Figure 13:
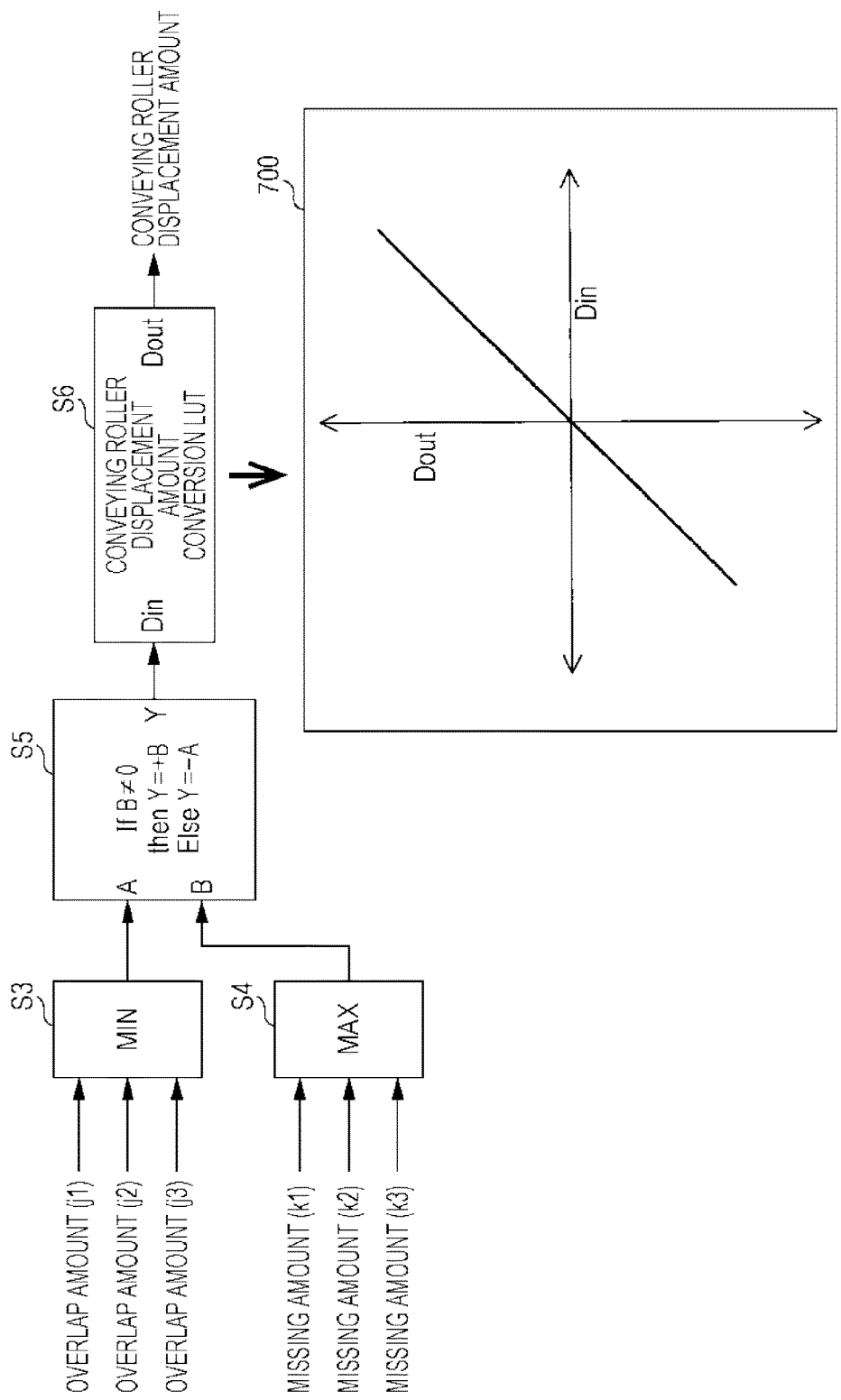
FIG. 13 is a diagram for explaining a process to determine an adjustment amount (a displacement amount) of a document conveying roller by the adjustment amount determination unit.

FIG. 13 is a diagram for explaining a process to determine an adjustment amount (displacement amount) of the document conveying rollers, by the adjustment amount determination unit 420 of FIG. 5. When the overlap amount/missing amount detection unit 410 detects overlap amounts (j1) to (j3), a smallest value among the detected overlap amounts is selected in step S3. When missing amounts (k1) to (k3) are detected, a largest value among the detected missing amounts is selected in step S4. In step S5, as the selected overlap amount and missing amount are referred to as A and B respectively, B is preferentially output when there is a missing part (B≠0), and −A is output when there is not a missing part. In step S6, by using −A or B, which is output in step S5, displacement amounts in the vertical direction are determined, regarding the pre-reading conveying roller 201 and post-reading conveying roller 202 which are located near the overlap area or missing area of the document in which the overlap amount A or missing amount B has occurred. The displacement amount determination is performed with reference to a look-up table (LUT) 700 in which a relationship between the overlap amount or missing amount (Din) and the displacement amount (Dout) are defined in advance, and a determination is made by converting the overlap amount or missing amount (Din) into a corresponding displacement amount.

As indicted by the graph in the look-up table 700, the overlap amount and missing amount (Din) and the displacement amount (Dout) are in a proportional relation. While the positive region of the horizontal axis Din represents an image missing amount and the negative region represents an image overlap amount, the positive region of the vertical axis Dout represents an upward displacement amount and the negative region represents a downward displacement. Thus, when there is an image missing amount B, the table 700 is referred as setting Din as B and the pre-reading conveying roller 201 and post-reading conveying roller 202 are displaced upward and, when there is an image overlap amount A, the table 700 is referred as setting Din as −A and the pre-reading conveying roller 201 and post-reading conveying roller 202 are displaced downward.

In this manner, the pre-reading conveying roller 201 and post-reading conveying roller 202 to which position adjustment is to be performed are specified and, after the displacement direction and displacement amount are determined, the specified pre-reading conveying roller 201 and post-reading conveying roller 202 are displaced upward or downward by an amount equal to the displacement amount.

Figure 14:
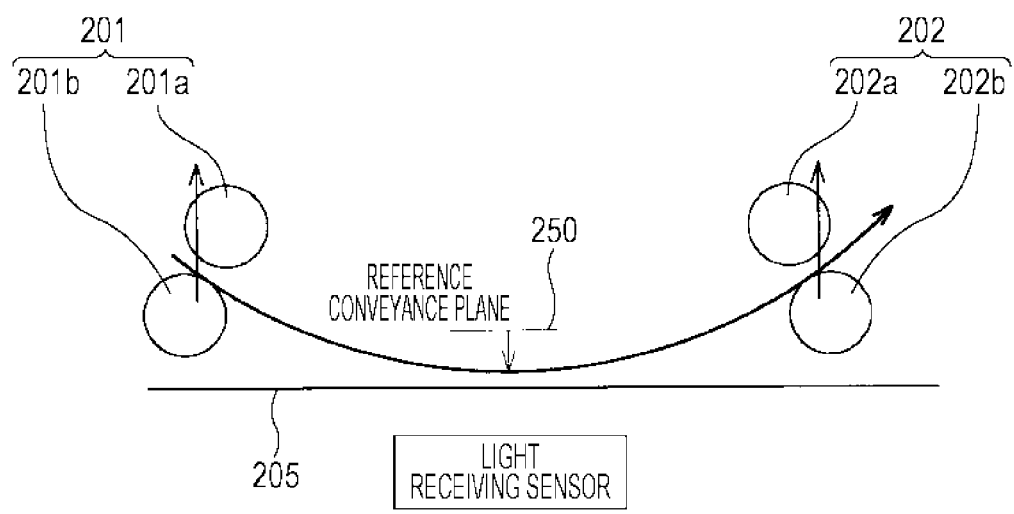
FIG. 14 is a diagram for explaining a displacement direction of a conveying roller when an image missing amount is detected.
Figure 15:
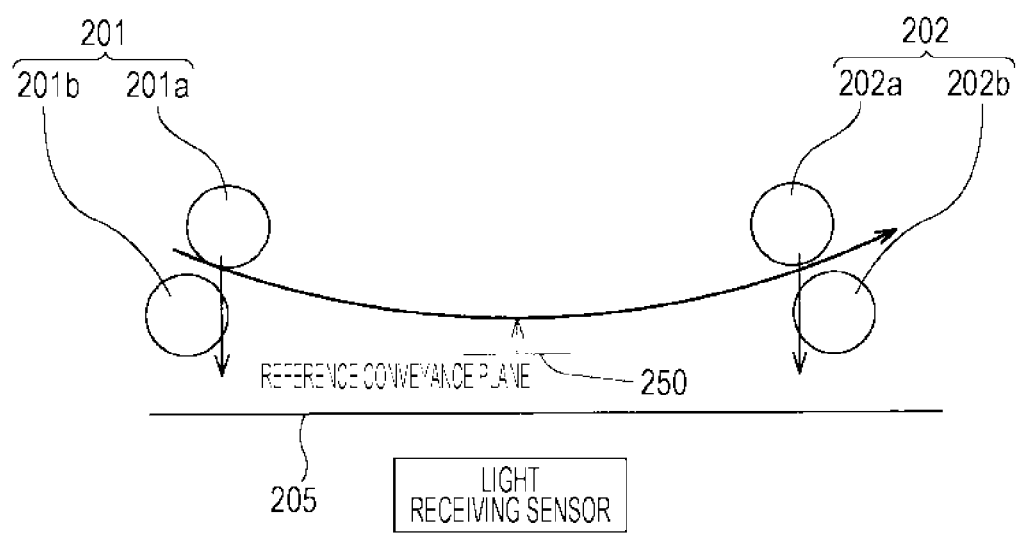
FIG. 15 is a diagram for explaining a displacement direction of a conveying roller when an image overlap amount is detected.

Concretely, in a case where an image missing area has occurred, since the document conveyance position is lower than the reference conveyance plane 250, the distance between the light receiving sensors 1 to N and the document is made larger by displacing, via the drive unit 401, the pre-reading conveying roller 201 and post-reading conveying roller 202 upward respectively by an amount equal to the determined displacement amount (adjustment amount) as indicated by the arrows in FIG. 14. On the other hand, in a case where an image overlap area has occurred, since the document conveyance position is above the reference conveyance plane 250, the distance between the light receiving sensors 1 to N and the document is made smaller by displacing, via the drive unit 401, the pre-reading conveying roller 201 and post-reading conveying roller 202 downward respectively by an amount equal to the determined displacement amount (adjustment amount) as indicated by the arrows in FIG. 15. With such a position adjustment of the pre-reading conveying roller 201 and post-reading conveying roller 202, an occurrence of an image missing area and an image overlap area can be suppressed and high quality read image data can be obtained.

The displacement of the pre-reading conveying roller 201 and post-reading conveying roller 202 may be manually performed by the user or may be automatically performed. After the adjustment amount is determined, as illustrated in FIG. 16, the display unit 71 of the operation panel 70 displays a "Yes" button and a "No" button as well as a message to confirm whether or not to perform an automatic adjustment. When the user presses the "Yes" button, as illustrated in FIG. 17, the display unit 71 displays the pre-reading conveying roller 201 and post-reading conveying roller 202 which are the adjustment targets and an adjustment amount as well as a message that leads the user to operate a start button.

When the user presses the start button, information that indicates the pre-reading conveying roller 201 and post-reading conveying roller 202 as the adjustment targets and the adjustment amount is transmitted to the control unit 100, and the control unit 100 displaces the pre-reading conveying roller 201 and post-reading conveying roller 202 as the adjustment targets via the drive unit 401.

On the other hand, when the user presses the "No" button on the screen of FIG. 16, as illustrated in FIG. 18, the display unit 71 of the operation panel 70 displays the pre-reading conveying roller 201 and post-reading conveying roller 202, which are the adjustment targets, an adjustment amount, and a message to lead to the adjustment. As the adjustment amount, the determined displacement amount may be displayed as it is or an operation amount for the drive unit 401 may be displayed.

According to this display, the user displaces the pre-reading conveying roller 201 and post-reading conveying roller 202 as the adjustment targets upward or downward by a manual operation.

After the adjustment, the user operates to read the overlap amount and/or missing amount detection chart again by the light receiving sensors 1 to N according to need and may repeat each process of the overlap amount/missing amount detection, adjustment amount determination, and display on the display unit 71 until the adjustment amount becomes zero and the adjustment amount of zero is displayed on the display unit 71.

Figure 19:
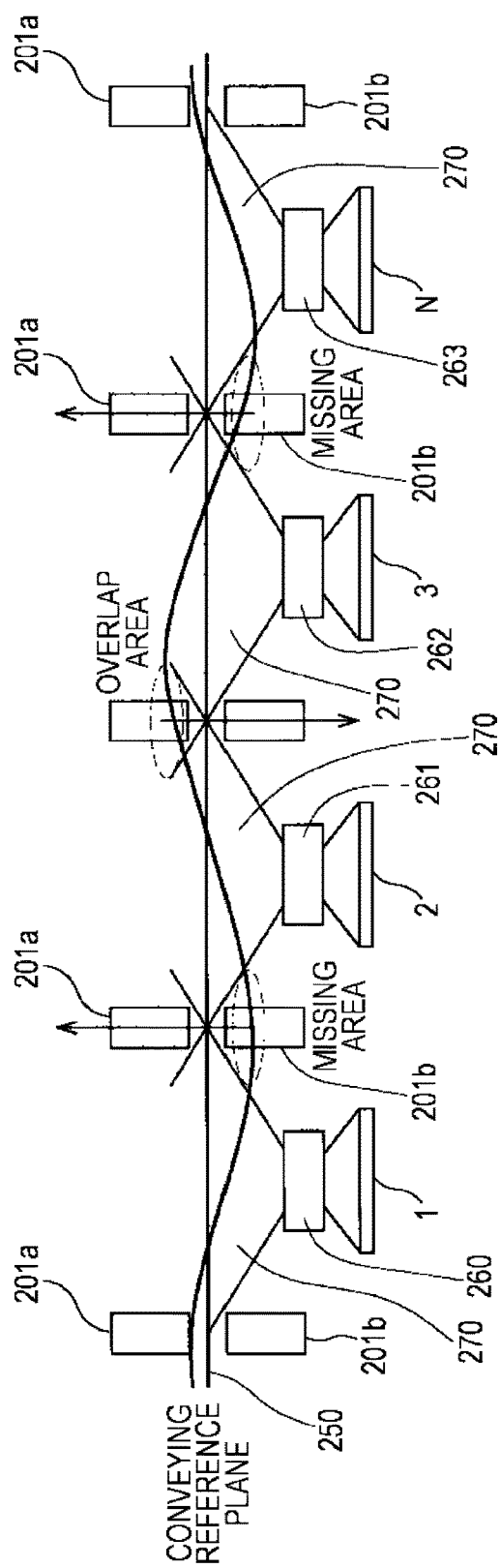
FIG. 19 is a diagram illustrating a condition of displacing a conveying roller near a part where an image overlap area or an image missing area has occurred.

By repeating the processes in this manner, as illustrated in FIG. 19, the positions of the pre-reading conveying roller 201 and post-reading conveying roller 202 located at a part where an image overlap area or an image missing area is being generated are adjusted one by one, and the document 300 can be made to pass on the reference conveyance plane 250 or a position closer to this plane in the end as suppressing differences of the distance between the document and the light receiving sensors in the main scanning direction.

According to the present embodiment, as described in FIG. 13, the overlap amount/missing amount detection unit 410 can properly adjust the distance between the document and light receiving sensors in the image missing area by selecting one overlap amount in step S3 while selecting one missing amount in step S4 and, when a missing amount is detected in step S5, adjusting the positions of the pair of the pre-reading conveying roller 201 and post-reading conveying roller 202 located near a part where an image missing area has occurred as preferentially handling the missing amount. Then, by repeating these processes according to need, the positions of the pre-reading conveying roller 201 and post-reading conveying roller 202 located near the area where an image overlap area or an image missing area has occurred can be adjusted sequentially. However, the positions of a plurality of pairs of the pre-reading conveying roller 201 and post-reading conveying roller 202 respectively located near a plurality of parts where an image overlap area or image missing area has occurred may be adjusted at the same time. In this case, the adjustment amount (displacement amount) of the respective pre-reading conveying roller 201 and post-reading conveying roller 202 may be obtained by referring to the look-up table of FIG. 13 respectively.

Figure 20:
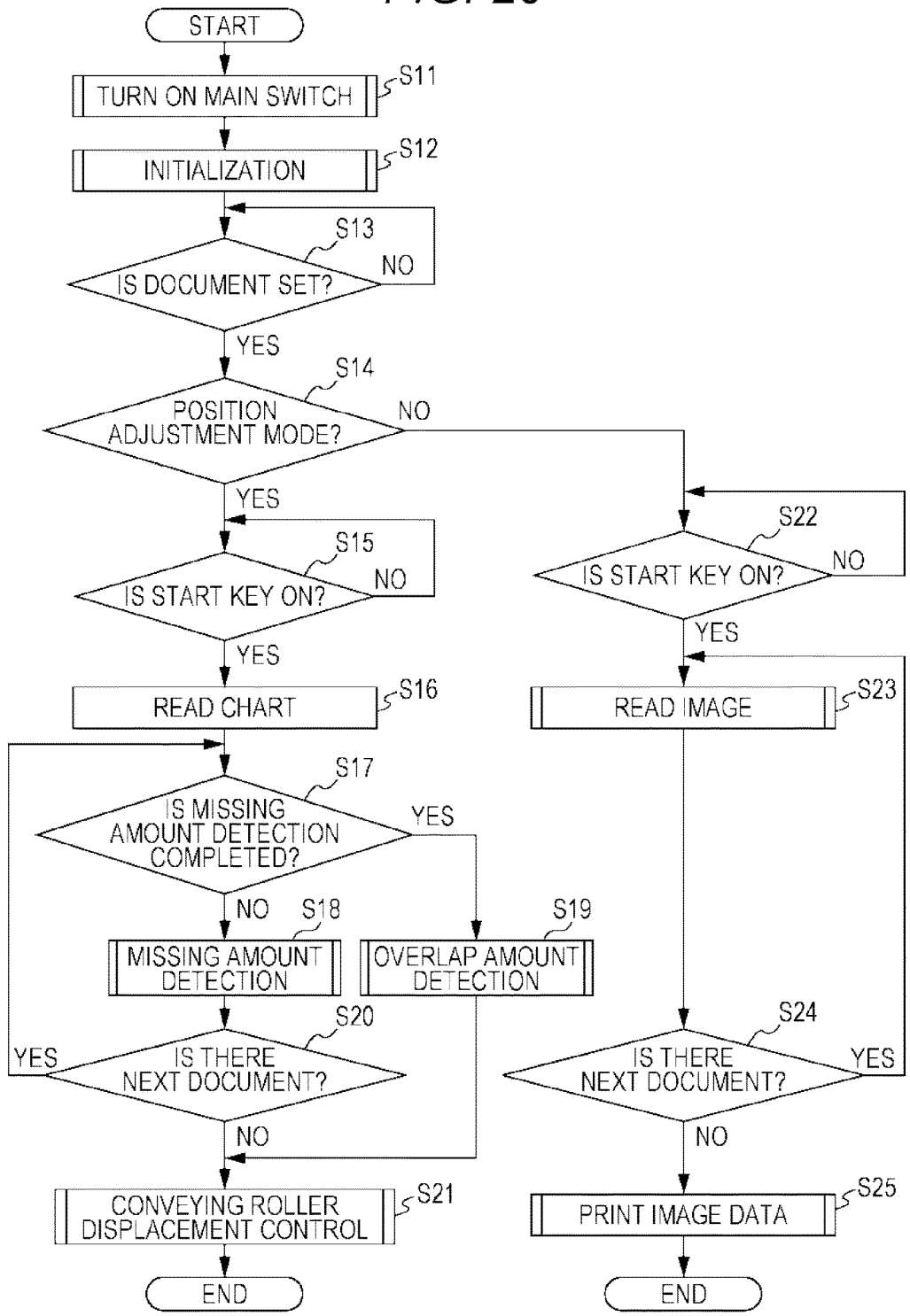
FIG. 20 is a flowchart for explaining an example of an operation of the image forming apparatus when a detection of an image overlap amount/missing amount and a conveying roller position adjustment are performed.

FIG. 20 is a flowchart for explaining an example of an operation of the image forming apparatus in a case where an image overlap amount/missing amount detection and a conveying roller position adjustment are performed. This operation is executed by that the CPU 101 of the control unit 100 in the image forming apparatus operates according to an operation program stored in a storage medium such as the ROM 102. Here, this example describes a case where a missing amount and an overlap amount are detected by reading a missing amount detection chart and an overlap amount detection chart which is different from the missing amount detection chart.

When the user turns on a main switch, it is detected that the main switch has been turned on in step S11 and then a necessary initialization process is executed in step S12.

Next, in step S13, it is checked whether a document is set on the automatic document feeder 10 and waits a document to be set when any document has not been set (NO in step S13). When a document is set (YES in step S13), in step S14, it is checked whether it is in a conveying roller position adjustment mode including an image overlap amount/missing amount detection. When a position adjustment of the conveying roller is executed, the user presses an unillustrated mode button to set a mode in advance.

When it is in a position adjustment mode (YES in step S14), it waits that the start key is pressed in step S15 (NO in step S15) and, when the start key is pressed (YES in step S15), the document (chart) is read in step S16.

Next, in step S17, it is determined whether the missing amount detection and the adjustment amount (displacement amount) determination is completed. When it is not completed (NO in step S17), the missing amount is detected and the adjustment amount is determined in step S18, and it is checked whether there is a next document in step S20. When there is not a next document (NO in step S20), the process proceeds to step S21. When there is a next document (YES in step S20), the process proceeds to step S17. When the missing amount detection and the like is completed in step S17 (YES in step S17), an overlap amount is detected and an adjustment amount is determined in step S19 and then the process proceeds to step S21.

In step S21, after performing a conveying roller displacement control, the process ends. The conveying roller displacement control will be described later.

When it is not in a conveying roller position adjustment mode in step S14 (NO in step S14), since it is a normal job mode, it waits that the start key is turned on in step S22 (NO in step S22). When the start key is turned on (YES in step S22), an image of the document is read in step S23 and it is checked whether or not there is a next document in step S24. When there is a next document (YES in step S24), the process returns to step S23 and an image of the document is read. When reading of the all the documents is completed (NO in step S24), image data is printed on a sheet in step S25 and the process ends.

Figure 21:
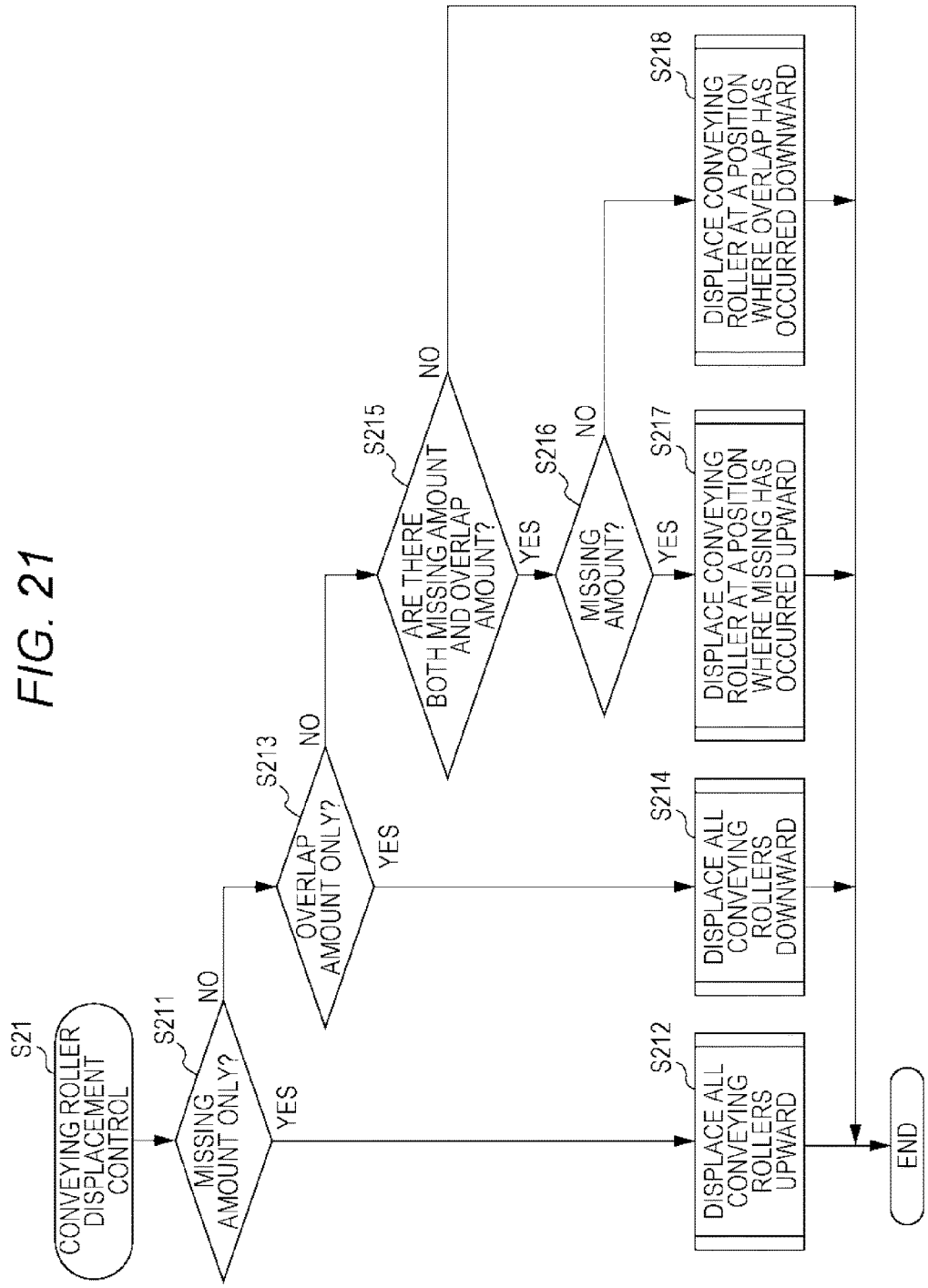
FIG. 21 is a flowchart illustrating content of the conveying roller displacement control in step S21 of FIG. 20.

FIG. 21 is a flowchart illustrating content of the conveying roller displacement control in step S21 of FIG. 20. The displacement control is a control to displace upward or downward the pre-reading conveying roller 201 and post-reading conveying roller 202 by an amount equal to a determined adjustment amount. According to the present embodiment, it is explained a case where the all of the pre-reading conveying rollers 201 and post-reading conveying rollers 202 corresponding to the parts where an overlap amount or a missing amount is detected are displaced and adjusted.

In step S211, it is determined whether only a missing amount is detected. When only a missing amount is detected (YES in step S211), in step S212, all the corresponding pre-reading conveying rollers 201 and post-reading conveying rollers 202 are displaced upward.

When it is not that only a missing amount is detected in step S211 (NO in step S211), it is determined whether only an overlap amount is detected in step S213. When only an overlap amount is detected (YES in step S213), in step S214, all the corresponding pre-reading conveying rollers 201 and post-reading conveying rollers 202 are displaced downward.

When it is not that only an overlap amount is detected in step S213 (NO in step S213), in step S215, it is determined whether or not there are both a missing amount and an overlap amount. When there are both a missing amount and an overlap amount (YES in step S215), in step S216, there is a part where a missing amount has occurred. When there is a part where a missing amount has occurred (YES in step S216), the corresponding pre-reading conveying roller 201 and post-reading conveying roller 202 are displaced upward. When there is not a part where a missing amount has occurred (NO in step S216), since there is a part where an overlap amount has occurred, the corresponding pre-reading conveying roller 201 and post-reading conveying roller 202 are displaced downward.

In step S215, there is neither a missing amount nor an overlap amount (NO in step S215), the process ends.

Here, in a case where there provided only a pair of the pre-reading conveying roller 201 and post-reading conveying roller 202, adjustment is performed so as to preferentially prevent a missing amount from occurring. This is because a case of image missing causes a greater impact and, in a case of an image overlap, since image data itself exists and the entire image can be combined by using the image data.

Figure 22:
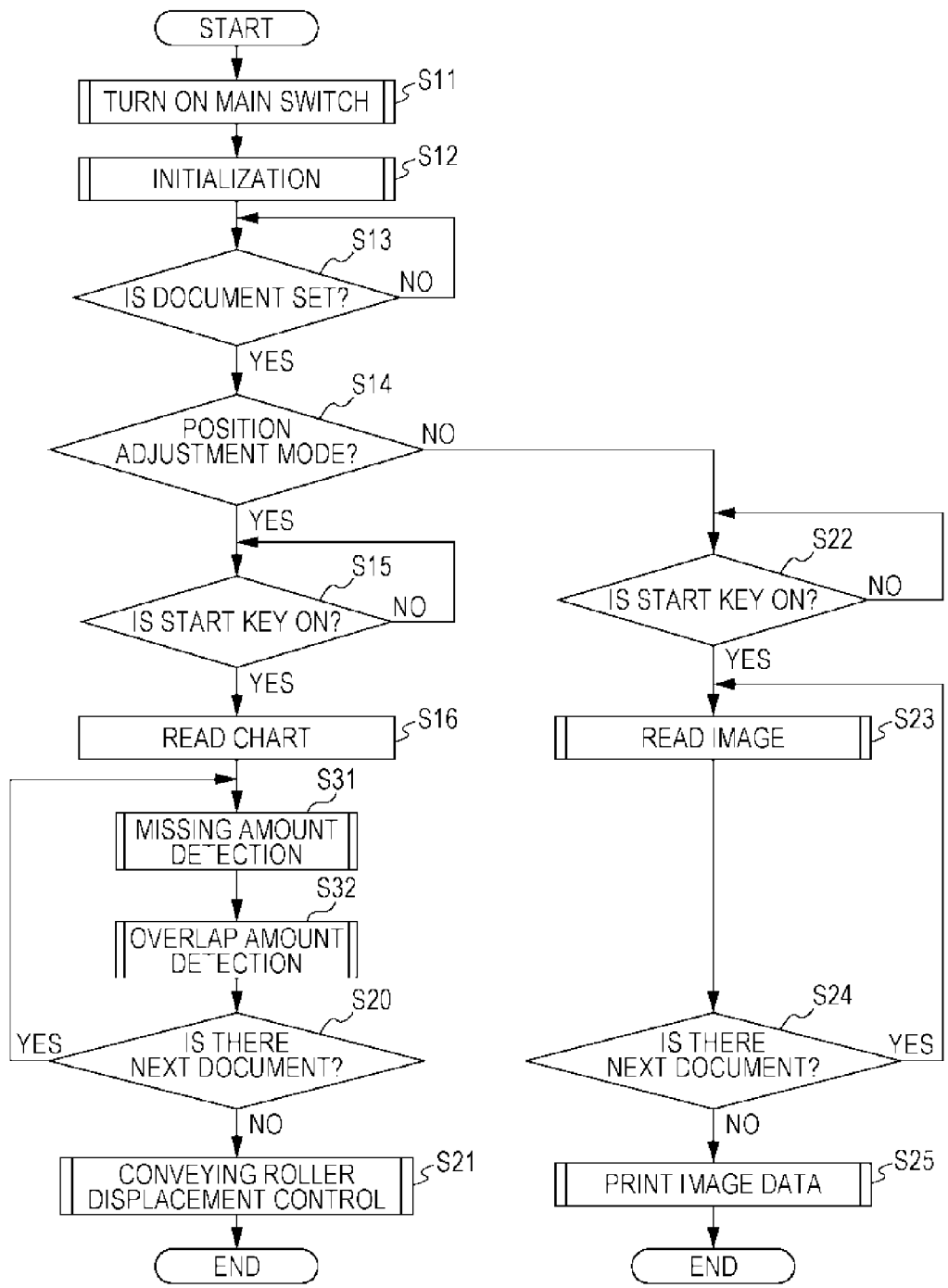
FIG. 22 is a flowchart for explaining an example of the image forming apparatus when an image overlap amount/missing amount detection and a conveying roller position adjustment are performed.

FIG. 22 is a flowchart for explaining an example of an operation of the image forming apparatus when an image overlap amount/missing amount detection and a conveying roller position adjustment are performed. This operation is also executed by that the CPU 101 of the control unit 100 in the image forming apparatus operates according to an operation program stored in a storage medium such as the ROM 102. Here, in this example, a missing amount and an overlap amount are detected by reading a chart 530 on which the missing amount detection image 532 and overlap amount detection image 531 which are illustrated in FIGS. 11A and 11B are displayed.

In this example, since a procedure of the missing amount/overlap amount detection after the process of reading a chart in step S16 in the flowchart of FIG. 20 is only the difference, the same step numbers are applied to the same process in the flowchart of FIG. 20 and the detail explanation thereof will be omitted.

In FIG. 22, in step S16, a sheet of chart 530 on which the missing amount detection image 532 and the overlap amount detection image 531 are displayed is read. Next, a missing amount is detected and an adjustment amount is determined in step S31, and further, an overlap amount is detected and an adjustment amount is determined in step S32 and it is checked whether or not there is a next document in step S20. When there is not a next document (NO in step S20), the process proceeds to step S21. When there is a next document (YES in step S20), the process proceeds to step S31.

Also in the present embodiment, the process ends after a conveying roller displacement control is performed in step S21.

In the above, although the embodiments of the present invention have been explained, the present invention is not limited to the above embodiments. For example, it has been explained that the pre-reading conveying roller 201 and post-reading conveying roller 202 are integrally displaced; however, only one of the rollers may be displaced.

Further, it has been explained that the adjustment of the distance between the document 300 and light receiving sensors 1 to N is performed by displacing the pre-reading conveying roller 201 and post-reading conveying roller 202 upward or downward; however, at least one of the light receiving sensors 1 to N is configured to be adjustable upward or downward via a drive unit and the distance between the document 300 and light receiving sensors 1 to N may be adjusted by displacing the light receiving sensors 1 to N upward or downward. Further, it may be configured that the both of the pre-reading conveying roller 201 and post-reading conveying roller 202 and the light receiving sensors 1 to N are displaced upward or downward.

Further, both of the image overlap amount and image missing amount do not have to be detected, and it may be configured that one of the image overlap amount and image missing amount is detected and the corresponding pre-reading conveying roller 201 and post-reading conveying roller 202 are displaced.

According to an embodiment of the present invention, an image overlap amount in an image overlap area which occurs when a part of the document in a main scanning direction is redundantly read by adjacent two light receiving sensors in a case where the document is conveyed at a position apart from a reference conveyance plane as being away from the light receiving sensor and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensor is detected in a plurality of parts, in the main scanning direction, from image data of the document read by the light receiving sensor. Further, based on the image overlap amount and/or image missing amount detected by the overlap amount/missing amount detection unit, an adjustment amount for adjusting a distance between the light receiving sensors and the document in at least one part of the main scanning direction of the document is determined. Then, according to the determined adjustment amount, the distance between the document and the light receiving sensors can be adjusted by displacing, via the drive unit, at least one of the document conveying roller or light receiving sensors. Thus, since the distance between the light receiving sensors and the document can be adjusted by displacing, via the drive unit, at least one of the document conveying roller and light receiving sensors, high quality read image data can be acquired by suppressing an occurrence of an image overlap area caused by that an image is redundantly read by the adjacent light receiving sensors and/or an image missing area which is not read by any of the adjacent light receiving sensors missing area.

According to an embodiment of the present invention, a number of pixels, in the main scanning direction, of an area different from an area of the expected value of the image data when there is no image overlap area or image missing area in a border part of the image data read by the adjacent light receiving sensors, is detected as an image overlap amount and/or an image missing amount.

According to an embodiment of the present invention, among the plurality of document conveying rollers arranged at intervals in the main scanning direction of the document, when an image overlap amount is detected, a document conveying roller located near the image overlap area in the document is displaced so that the distance between the document face and the light receiving sensors becomes smaller and, when an image missing amount is detected, a document conveying roller located near the image missing area in the document is displaced so that the distance between the document face and the light receiving sensors becomes larger. This enables to properly maintain the distance between the document and the light receiving sensors in the main scanning direction when the document is read.

According to an embodiment of the present invention, since a necessary displacement amount of at least one of the document conveying rollers and light receiving sensors is displayed, the drive unit is manually operated based on the necessary displacement amount displayed on the display unit to displace at least one of the document conveying roller and light receiving sensors.

According to an embodiment of the present invention, by instructing the necessary displacement amount displayed on the display unit, the drive unit automatically operates and a displacement control according to the necessary displacement amount is automatically executed.

According to an embodiment of the present invention, by referring a table in which a relationship between an image overlap amount and/or image missing amount and an adjustment amount of a distance between the light receiving sensors and the document are defined in advance, an adjustment amount is determined by converting the detected image overlap amount and/or image missing amount into a corresponding adjustment amount.

According to an embodiment of the present invention, the image overlap amount and/or image missing amount and the adjustment amount are defined in the table in a proportional relation.

According to an embodiment of the present invention, after displacing, by the drive unit, at least one of the document conveying roller or light receiving sensors, the determination of image overlap amount and/or image missing amount by the overlap amount/missing amount detection unit, the adjustment amount determination by the adjustment amount determination unit, and the display of the necessary displacement amount on the display unit are executed once or repeated more than once and, when the adjustment amount by the adjustment amount determination unit becomes zero, since the display unit displays that the necessary adjustment amount is zero, the user can recognize that the displacement adjustment of at least one of the document conveying roller and the light receiving sensor has finished.

According to an embodiment of the present invention, since the distance between the document and the light receiving sensors can be adjusted by displacing at least one of the document conveying rollers and light receiving sensors, a high quality read image data can be acquired by suppressing an occurrence of an image overlap area or an image missing area.

According to an embodiment of the present invention, an image overlap amount in an image overlap area which occurs when a part of the document in a main scanning direction redundantly read by adjacent two of the light receiving sensors in a case where the document is conveyed at a position apart from the reference conveyance plane so that the distance from the light receiving sensor becomes larger and/or an image missing amount in an image missing area which occurs when a part of the document in the main scanning direction is not read by any of the adjacent two light receiving sensors in a case where the document is conveyed at a position apart from the reference conveyance plane so that the distance from the light receiving sensor becomes smaller is detected from image data of the document read by the light receiving sensor, and a process of determining an adjustment amount of a distance between the light receiving sensors and the document in at least one part in the main scanning direction of the document based on the detected image overlap amount and/or image missing amount, and adjusting the distance between the document and the light receiving sensors by displacing one of the document conveying rollers and the light receiving sensors based on the determined adjustment amount, can be caused by a computer in an image reading device.

Although the present invention has been described and illustrated in detail, it is clearly understood that the same is by way of illustrated and example only and is not to be taken by way of limitation, the scope of the present invention being interpreted by terms of the appended claims.

What is claimed is:

1. An image reading device comprising:
    a plurality of light receiving sensors, which use an optical shrink system, configured to read an image of a document conveyed in a sub-scanning direction and be arranged with an interval in a main scanning direction, the plurality of light receiving sensors arranged so that border parts of reading areas read by adjacent two of the light receiving sensors in the main scanning direction correspond to each other on or under a reference conveyance plane of the document;
    at least one pair of document conveying rollers configured to be provided in front and back of the plurality of light receiving sensors in the sub-scanning direction;
    a detection unit configured to detect an image overlap amount in an image overlap area which occurs when a part of the document in the main scanning direction is redundantly read by the adjacent two light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensor, from a plurality of parts in the main scanning direction of the image data of the document read by the light receiving sensors;
    an adjustment amount determination unit configured to determine an adjustment amount for adjusting a distance between the document and the light receiving sensors in at least one part of the document in the main scanning direction based on the image overlap amount and/or image missing amount detected by the detection unit; and
    a drive unit configured to adjust the distance between the document and the light receiving sensors by displacing at least one of the document conveying rollers and the light receiving sensors according to the adjustment amount determined by the adjustment amount determination unit.

2. The image reading device according to claim 1, wherein
    the detection unit detects, as the image overlap amount and/or image missing amount, a number of pixels in the main scanning direction of a region, which is a different region of an expected value of the image data in a case where an image overlap area and an image missing area do not exist, in the border parts of the image data read by the adjacent light receiving sensors.

3. The image reading device according to claim 1, wherein
    the plurality of the document conveying rollers are provided at intervals in the main scanning direction of the document, and the drive unit displaces the document conveying roller located near the image overlap area of the document so that the distance between the document face and the light receiving sensors becomes smaller when an image overlap amount is detected, and displaces the document conveying roller located near the image missing area of the document so that the distance between the document face and the light receiving sensors becomes larger when an image missing amount is detected.

4. The image reading device according to claim 1, further comprising a display unit configured to display a necessary displacement amount, which is to be executed by the drive unit, of at least one of the document conveying rollers and the light receiving sensors, wherein the displacement, by the drive unit, of at least one of the document conveying rollers and the light receiving sensors is manually operated based on the necessary displacement amount displayed on the display unit.

5. The image reading device according to claim 4, wherein after displacing at least one of the document conveying rollers and the light receiving sensors by the drive unit, the detection of an image overlap amount and/or image missing amount by the detection unit, the adjustment amount determination by the adjustment amount determination unit, and the display of the necessary displacement amount on the display unit can be executed once or repeated more than once, and when the adjustment amount determined by the adjustment amount determination unit becomes zero, the display unit displays that the necessary displacement amount is zero.

6. The image reading device according to claim 1, further comprising a display unit configured to display a necessary displacement amount, by the drive unit, of at least one of the document conveying rollers and the light receiving sensors, wherein the necessary displacement amount displayed on the display unit is a displacement amount to instruct the drive unit to execute an automatic control.

7. The image reading device according to claim 1, wherein the adjustment amount determination unit determines an adjustment amount by converting the image overlap amount and/or image missing amount detected by the detection unit into a corresponding adjustment amount with reference to a table in which a relationship between the image overlap amount and/or image missing amount and an adjustment amount of the distance between the light receiving sensors and document is defined in advance.

8. The image reading device according to claim 7, wherein the image overlap amount and/or image missing amount and the adjustment amount defined in the table are in a proportional relation.

9. A method of adjusting a distance between a document and light receiving sensors executed in an image reading device comprising:

a plurality of light receiving sensors, which use an optical shrink system, configured to read an image of a document conveyed in a sub-scanning direction and be arranged at intervals in a main scanning direction, the plurality of light receiving sensors arranged so that border parts of reading areas of adjacent two of the light receiving sensors in the main scanning direction correspond to each other on or under a reference conveyance plane of the document; and at least one pair of document conveying rollers configured to be provided in front and back of the plurality of light receiving sensors in the sub-scanning direction, the method comprising:

an overlap amount/missing amount detection step of detecting an image overlap amount in an image overlap area which occurs when a part of the document in the main scanning direction is redundantly read by adjacent two of the light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensors, from a plurality of parts in the main scanning direction of the image data of the document read by the light receiving sensors;

an adjustment amount determination step of determining an adjustment amount used to adjust a distance between the document and the light receiving sensors in at least one part of the document in the main scanning direction based on the image overlap amount and/or image missing amount detected in the overlap amount/missing amount detection step; and a driving step of adjusting the distance between the document and the light receiving sensors by displacing at least one of the document conveying rollers and the light receiving sensors according to the adjustment amount determined in the adjustment amount determination step.

10. A non-transitory recording medium storing a computer readable program for adjusting a distance between a document and light receiving sensors, the program causing a computer of an image reading device comprising:

a plurality of light receiving sensors, which use an optical shrink system, configured to read an image of a document conveyed in a sub-scanning direction and be arranged at intervals in a main scanning direction, the plurality of light receiving sensors arranged so that border parts of reading areas of adjacent two of the light receiving sensors in the main scanning direction correspond to each other on or under a reference conveyance plane of the document; and at least one pair of document conveying rollers configured to be provided in front and back of the plurality of light receiving sensors in the sub-scanning direction to execute:

a detection step of detecting an image overlap amount in an image overlap area which occurs when a part of the document in the main scanning direction is redundantly read by adjacent two of the light receiving sensors in a case where the document is conveyed at a position apart from the reference conveyance plane as being away from the light receiving sensors and/or an image missing amount in an image missing area which occurs when a part of the document in the main scanning direction is not read by any of the adjacent two light receiving sensors in a case where the document is conveyed at a position apart from the reference conveyance plane as being closer to the light receiving sensors, from a plurality of parts in the main scanning direction of the image data of the document read by the light receiving sensors;

a determination step of determining an adjustment amount for adjusting a distance between the document and the light receiving sensors in at least one part of the document in the main scanning direction based on the image overlap amount and/or image missing amount detected in the overlap amount/missing amount detection step; and an adjusting step of adjusting the distance between the document and the light receiving sensors by displacing at least one of the document conveying rollers and the light receiving sensors according to the adjustment amount determined in the adjustment amount determination step.

11. The non-transitory recording medium storing a computer readable program according to claim 10, wherein
in the detection step, in the border parts of the image data read by the adjacent light receiving sensors, a number of pixels in the main scanning direction of a region, which is different from a region of an expected value of image data having no image overlap area or image missing area, is detected as the image overlap amount and/or image missing amount.

12. The non-transitory recording medium storing a computer readable program according to claim 10, wherein
the plurality of document conveying rollers are arranged at intervals in the main scanning direction of the document, and
in the adjusting step, when an image overlap amount is detected, the document conveying roller located near the image overlap area of the document is displaced so that the distance between the document face and the light receiving sensors becomes smaller and, when an image missing amount is detected, the document conveying roller located near the image missing area of the document so that the distance between the document face and the light receiving sensors becomes larger.

13. The non-transitory recording medium storing a computer readable program according to claim 10, the program further causing the computer to execute a displaying step of displaying a necessary displacement amount of at least one of the document conveying rollers and the light receiving sensors in the adjusting step, wherein
the displacement of at least one of the document conveying rollers and the light receiving sensors in the adjusting step is manually operated based on the displayed necessary displacement amount.

14. The non-transitory recording medium storing a computer readable program according to claim 13, wherein
after displacing at least one of the document conveying rollers and the light receiving sensors in the adjusting step, the detection of the image overlap amount and/or image missing amount in the detection step, the adjustment amount determination in the determining step, and a display of the necessary displacement amount in the displaying step can be executed once or repeated more than once, and
when the adjustment amount determined in the determining step becomes zero, it is displayed that the necessary displacement amount is zero in the displaying step.

15. The non-transitory recording medium storing a computer readable program according to claim 10, the program further causing the computer to execute a displaying step of displaying a necessary displacement amount of at least one of the document conveying rollers and the light receiving sensors in the adjusting step, wherein
the displayed necessary displacement amount is a displacement amount to instruct an automatic control in the adjusting step.

16. The non-transitory recording medium storing a computer readable program according to claim 10, wherein
in the determination step, an adjustment amount is determined by converting the image overlap amount and/or image missing amount detected in the detection step into a corresponding adjustment amount with reference to a table in which a relationship between the image overlap amount and/or image missing amount and an adjustment amount of the distance between the light receiving sensors and the document is defined in advance.

17. The non-transitory recording medium storing a computer readable program according to claim 16, wherein
the image overlap amount and/or image missing amount and the adjustment amount defined in the table are in a proportional relation.

* * * * *